(12) United States Patent
Wong et al.

(10) Patent No.: US 10,191,230 B2
(45) Date of Patent: Jan. 29, 2019

(54) OPTICAL CONNECTORS WITH REVERSIBLE POLARITY

(71) Applicant: SENKO Advanced Components, Inc., Marlborough, MA (US)

(72) Inventors: Kimman Wong, Hong Kong (HK); Jeffrey Gniadek, Northbridge, MA (US); Kazuyoshi Takano, Southborough, MA (US); Siu Kei Ma, Hong Kong (HK)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 15/884,327

(22) Filed: Jan. 30, 2018

(65) Prior Publication Data

US 2018/0217340 A1 Aug. 2, 2018

Related U.S. Application Data

(60) Provisional application No. 62/581,961, filed on Nov. 6, 2017, provisional application No. 62/546,920, filed on Aug. 17, 2017, provisional application No. 62/485,042, filed on Apr. 13, 2017, provisional application No. 62/463,901, filed on Feb. 27, 2017, provisional application No. 62/463,898, filed on Feb. 27, 2017, provisional application No. 62/457,150, (Continued)

(51) Int. Cl.
*G02B 6/38* (2006.01)

(52) U.S. Cl.
CPC ......... *G02B 6/3893* (2013.01); *G02B 6/3821* (2013.01)

(58) Field of Classification Search
CPC ....... G02B 6/38; G02B 6/3821; G02B 6/3893
See application file for complete search history.

(56) References Cited

U.S. PATENT DOCUMENTS 3,721,945 A  3/1973 Hults
4,327,964 A  5/1982 Haesly et al.
(Continued)

FOREIGN PATENT DOCUMENTS

CA  2495693 A1  4/2004
CN  2836038 Y  11/2006
(Continued)

OTHER PUBLICATIONS

EP Search Report and Opinion dated Mar. 2015 EP 14187661.
(Continued)

*Primary Examiner* — Andrew Jordan
(74) *Attorney, Agent, or Firm* — Edward S. Jarmolowicz, Esq.

(57) ABSTRACT

Reversible polarity fiber optic connectors are provided having housings at least partially surrounding first and second optical ferrules with walls above and beneath the ferrules. Positioning removable elements such as latches, removable arms, or push-pull tabs on the first wall above the ferrules yields fiber optic connectors with a first polarity type, and positioning the removable elements on the second wall beneath the ferrules yields fiber optic connectors with a second, opposite polarity type. Various engagement mechanisms are provided on either the connector housing walls or on the removable elements, or both, to assist in affixing the removable element to the connector housing.

25 Claims, 22 Drawing Sheets

Related U.S. Application Data filed on Feb. 9, 2017, provisional application No. 62/452,147, filed on Jan. 30, 2017.

(56) References Cited

U.S. PATENT DOCUMENTS

| | | | |
|---|---|---|---|
| 4,478,473 A * | 10/1984 | Frear | H01R 13/622 |
| | | | 439/312 |
| 4,762,388 A | 8/1988 | Tanaka et al. | |
| 4,764,129 A | 8/1988 | Jones et al. | |
| 4,840,451 A | 6/1989 | Sampson et al. | |
| 4,872,736 A | 10/1989 | Myers et al. | |
| 4,979,792 A | 12/1990 | Weber et al. | |
| 5,026,138 A * | 6/1991 | Boudreau | G02B 6/4202 |
| | | | 385/51 |
| 5,041,025 A | 8/1991 | Haitmanek | |
| D323,143 S | 1/1992 | Ohkura et al. | |
| 5,212,752 A | 5/1993 | Stephenson et al. | |
| 5,265,181 A | 11/1993 | Chang | |
| 5,289,554 A | 2/1994 | Cubukciyan et al. | |
| 5,317,663 A | 5/1994 | Beard et al. | |
| 5,335,301 A | 8/1994 | Newman et al. | |
| 5,348,487 A | 9/1994 | Marazzi et al. | |
| 5,444,806 A | 8/1995 | de Marchi et al. | |
| 5,481,634 A | 1/1996 | Anderson et al. | |
| 5,506,922 A | 4/1996 | Grois et al. | |
| 5,521,997 A | 5/1996 | Rovenolt et al. | |
| 5,570,445 A | 10/1996 | Chou et al. | |
| 5,588,079 A | 12/1996 | Tanabe et al. | |
| 5,684,903 A | 11/1997 | Kyomasu et al. | |
| 5,687,268 A | 11/1997 | Stephenson et al. | |
| 5,781,681 A | 7/1998 | Manning | |
| 5,937,130 A | 8/1999 | Amberg et al. | |
| 5,956,444 A | 9/1999 | Ouda et al. | |
| 5,971,626 A | 10/1999 | Knodell et al. | |
| 6,041,155 A | 3/2000 | Anderson et al. | |
| 6,049,040 A | 4/2000 | Biles et al. | |
| 6,134,370 A | 10/2000 | Childers et al. | |
| 6,178,283 B1 | 1/2001 | Weigel | |
| RE37,080 E | 3/2001 | Stephenson et al. | |
| 6,206,577 B1 | 3/2001 | Hall | |
| 6,206,581 B1 | 3/2001 | Driscoll et al. | |
| 6,227,717 B1 | 5/2001 | Ott et al. | |
| 6,238,104 B1 | 5/2001 | Yamakawa et al. | |
| 6,247,849 B1 | 6/2001 | Liu | |
| 6,364,537 B1 * | 4/2002 | Maynard | G02B 6/3831 |
| | | | 385/55 |
| 6,379,052 B1 * | 4/2002 | de Jong | G02B 6/3806 |
| | | | 385/59 |
| 6,461,054 B1 | 10/2002 | Iwase | |
| 6,471,412 B1 | 10/2002 | Belenkiy et al. | |
| 6,478,472 B1 | 11/2002 | Anderson et al. | |
| 6,485,194 B1 * | 11/2002 | Shirakawa | G02B 6/381 |
| | | | 385/78 |
| 6,530,696 B1 | 3/2003 | Ueda | |
| 6,551,117 B2 | 4/2003 | Poplawski et al. | |
| 6,579,014 B2 | 6/2003 | Metlon et al. | |
| 6,623,172 B1 * | 9/2003 | de Jong | G02B 6/3806 |
| | | | 385/59 |
| 6,634,796 B2 * | 10/2003 | de Jong | G02B 6/3831 |
| | | | 385/139 |
| 6,634,801 B1 | 10/2003 | Waldron | |
| 6,648,520 B2 | 11/2003 | McDonald et al. | |
| 6,682,228 B2 | 1/2004 | Rathnam et al. | |
| 6,695,486 B1 | 2/2004 | Falkenberg et al. | |
| 6,854,894 B1 | 2/2005 | Yunker et al. | |
| 6,865,362 B2 | 3/2005 | Otsuka et al. | |
| 6,869,227 B2 * | 3/2005 | Del Grosso | G02B 6/4471 |
| | | | 385/71 |
| 6,872,039 B2 | 3/2005 | Baus et al. | |
| 6,935,789 B2 | 8/2005 | Gross, III et al. | |
| 7,036,993 B2 | 5/2006 | Luther | |
| 7,077,576 B2 | 7/2006 | Luther | |
| 7,090,406 B2 | 8/2006 | Melton et al. | |
| 7,090,407 B2 | 8/2006 | Melton et al. | |
| 7,091,421 B2 | 8/2006 | Kukita et al. | |
| 7,111,990 B2 | 9/2006 | Melton et al. | |
| 7,113,679 B2 | 9/2006 | Melton et al. | |
| D533,504 S | 12/2006 | Lee | |
| D534,124 S | 12/2006 | Taguchi | |
| 7,150,587 B2 | 12/2006 | Luther et al. | |
| 7,153,041 B2 | 12/2006 | Mine et al. | |
| 7,198,409 B2 | 4/2007 | Smith et al. | |
| 7,207,724 B2 | 4/2007 | Gurreri | |
| D543,146 S | 5/2007 | Chen et al. | |
| 7,258,493 B2 | 8/2007 | Milette | |
| 7,264,402 B2 | 9/2007 | Theuerkorn | |
| 7,281,859 B2 | 10/2007 | Mudd | |
| D558,675 S | 1/2008 | Chein et al. | |
| 7,315,682 B1 | 1/2008 | En Lin et al. | |
| 7,325,976 B2 | 2/2008 | Gurreri et al. | |
| 7,325,980 B2 | 2/2008 | Pepe | |
| 7,329,137 B2 | 2/2008 | Martin et al. | |
| 7,331,718 B2 | 2/2008 | Yazaki et al. | |
| 7,354,291 B2 | 4/2008 | Caveney et al. | |
| 7,371,082 B2 | 5/2008 | Zimmel et al. | |
| 7,387,447 B2 | 6/2008 | Mudd | |
| 7,390,203 B2 | 6/2008 | Murano | |
| D572,661 S | 7/2008 | En Lin et al. | |
| 7,431,604 B2 | 10/2008 | Waters et al. | |
| 7,463,803 B2 | 12/2008 | Cody | |
| 7,465,180 B2 | 12/2008 | Kusuda et al. | |
| 7,510,335 B1 | 3/2009 | Su et al. | |
| 7,513,695 B1 | 4/2009 | Lin et al. | |
| 7,540,666 B2 | 6/2009 | Luther | |
| 7,581,775 B2 | 7/2009 | Lin et al. | |
| 7,591,595 B2 | 9/2009 | Lu et al. | |
| 7,594,766 B1 | 9/2009 | Sasser | |
| 7,641,398 B2 | 1/2010 | O'Riorden et al. | |
| 7,695,199 B2 | 4/2010 | Teo et al. | |
| 7,699,533 B2 | 4/2010 | Milette | |
| 7,785,019 B2 | 8/2010 | Lewallen | |
| 7,824,113 B2 | 11/2010 | Wong et al. | |
| 7,867,395 B2 | 1/2011 | Ekholm et al. | |
| D641,709 S | 7/2011 | Yamauchi | |
| 8,152,385 B2 * | 4/2012 | de Jong | G02B 6/3879 |
| | | | 385/53 |
| 8,186,890 B2 | 5/2012 | Lu | |
| 8,192,091 B2 | 6/2012 | Hsu et al. | |
| 8,202,009 B2 | 6/2012 | Lin et al. | |
| 8,251,733 B2 | 8/2012 | Wu | |
| 8,267,595 B2 | 9/2012 | Lin et al. | |
| 8,270,796 B2 | 9/2012 | Nhep | |
| 8,408,815 B2 | 4/2013 | Lin et al. | |
| 8,465,317 B2 | 6/2013 | Gniadek et al. | |
| 8,534,928 B2 | 9/2013 | Cooke | |
| 8,622,634 B2 | 1/2014 | Arnold | |
| 8,636,424 B2 | 1/2014 | Kuffel et al. | |
| 8,651,749 B2 | 2/2014 | Dainese Junior et al. | |
| 8,676,022 B2 * | 3/2014 | Jones | G02B 6/3849 |
| | | | 385/139 |
| 8,678,670 B2 | 3/2014 | takahashi | |
| 8,727,638 B2 | 5/2014 | Lee | |
| 8,770,863 B2 | 7/2014 | Cooke et al. | |
| 9,310,569 B2 * | 4/2016 | Lee | G02B 6/3825 |
| 9,366,829 B2 | 6/2016 | Czosnowski | |
| 9,465,172 B2 * | 10/2016 | Shih | G02B 6/3879 |
| 9,557,495 B2 * | 1/2017 | Raven | G02B 6/3879 |
| 9,658,409 B2 | 5/2017 | Gniadek | |
| 9,709,753 B1 | 7/2017 | Chang | |
| 9,778,425 B2 | 10/2017 | Nguyen | |
| 9,798,084 B2 | 10/2017 | Kuffel | |
| 9,829,645 B2 * | 11/2017 | Good | G02B 6/3883 |
| 9,880,361 B2 * | 1/2018 | Childers | G02B 6/3831 |
| 9,946,035 B2 * | 4/2018 | Gustafson | G02B 6/3821 |
| 10,031,296 B2 * | 7/2018 | Good | G02B 6/3831 |
| 2001/0026661 A1 * | 10/2001 | de Jong | G02B 6/3831 |
| | | | 385/56 |
| 2002/0191919 A1 | 12/2002 | Nolan | |
| 2003/0053787 A1 | 3/2003 | Lee | |
| 2004/0052473 A1 | 3/2004 | Seo et al. | |
| 2004/0136657 A1 | 7/2004 | Ngo | |
| 2004/0141693 A1 | 7/2004 | Szilagyi et al. | |
| 2004/0161958 A1 | 8/2004 | Togami et al. | |

(56) References Cited

U.S. PATENT DOCUMENTS

| | | | |
|---|---|---|---|
| 2004/0184741 A1* | 9/2004 | Del Grosso | G02B 6/3851 385/71 |
| 2004/0234209 A1 | 11/2004 | Cox et al. | |
| 2005/0111796 A1 | 5/2005 | Matasek et al. | |
| 2005/0141817 A1 | 6/2005 | Yazaki et al. | |
| 2005/0207709 A1* | 9/2005 | Del Grosso | G02B 6/4472 385/71 |
| 2006/0089049 A1 | 4/2006 | Sedor | |
| 2006/0127025 A1 | 6/2006 | Haberman | |
| 2006/0269194 A1 | 11/2006 | Luther et al. | |
| 2006/0274411 A1 | 12/2006 | Yamauchi | |
| 2007/0025665 A1 | 2/2007 | Dean | |
| 2007/0079854 A1 | 4/2007 | You | |
| 2007/0098329 A1 | 5/2007 | Shimoji et al. | |
| 2007/0149062 A1 | 6/2007 | Long | |
| 2007/0028409 A1 | 8/2007 | Yamada | |
| 2007/0230874 A1 | 10/2007 | Lin | |
| 2007/0232115 A1 | 10/2007 | Burke et al. | |
| 2007/0243749 A1 | 10/2007 | Wu | |
| 2008/0008430 A1 | 1/2008 | Kewitsch | |
| 2008/0044137 A1 | 2/2008 | Luther et al. | |
| 2008/0069501 A1 | 3/2008 | Mudd et al. | |
| 2008/0101757 A1 | 5/2008 | Lin et al. | |
| 2008/0226237 A1 | 9/2008 | O'Riorden et al. | |
| 2008/0267566 A1 | 10/2008 | Lin et al. | |
| 2009/0022457 A1 | 1/2009 | De Jong et al. | |
| 2009/0028507 A1 | 1/2009 | Jones et al. | |
| 2009/0196555 A1 | 8/2009 | Lin et al. | |
| 2009/0214162 A1 | 8/2009 | O'Riorden et al. | |
| 2009/0220197 A1 | 9/2009 | Gniadek | |
| 2010/0034502 A1 | 2/2010 | Lu et al. | |
| 2010/0092136 A1 | 4/2010 | Nhep | |
| 2010/0220961 A1* | 9/2010 | de Jong | G02B 6/3879 385/77 |
| 2010/0247041 A1 | 9/2010 | Szilagyi | |
| 2010/0322561 A1 | 12/2010 | Lin et al. | |
| 2011/0044588 A1 | 2/2011 | Larson et al. | |
| 2011/0131801 A1 | 6/2011 | Nelson et al. | |
| 2011/0177710 A1 | 7/2011 | Tobey | |
| 2012/0099822 A1 | 4/2012 | Kuffel et al. | |
| 2012/0189260 A1 | 7/2012 | Kowalczyk et al. | |
| 2012/0269485 A1 | 10/2012 | Haley et al. | |
| 2012/0301080 A1 | 11/2012 | Gniadek | |
| 2013/0071067 A1 | 3/2013 | Lin | |
| 2013/0089995 A1 | 4/2013 | Gniadek et al. | |
| 2013/0094816 A1 | 4/2013 | Lin et al. | |
| 2013/0121653 A1 | 5/2013 | Shitama et al. | |
| 2013/0170797 A1 | 7/2013 | Ott | |
| 2013/0183012 A1 | 7/2013 | Cabanne Lopez et al. | |
| 2013/0216185 A1 | 8/2013 | Klavuhn et al. | |
| 2013/0259429 A1 | 10/2013 | Czosnowski et al. | |
| 2013/0272671 A1* | 10/2013 | Jones | G02B 6/3831 385/139 |
| 2013/0308915 A1* | 11/2013 | Buff | G02B 6/4452 385/135 |
| 2013/0308916 A1* | 11/2013 | Buff | G02B 6/4452 385/135 |
| 2013/0322825 A1 | 12/2013 | Cooke et al. | |
| 2014/0016901 A1 | 1/2014 | Lambourn et al. | |
| 2014/0050446 A1 | 2/2014 | Chang | |
| 2014/0133808 A1 | 5/2014 | Hill et al. | |
| 2014/0334780 A1 | 11/2014 | Nguyen et al. | |
| 2014/0348477 A1 | 11/2014 | Chang | |
| 2015/0212282 A1* | 7/2015 | Lin | G02B 6/3893 385/76 |
| 2015/0241644 A1* | 8/2015 | Lee | G02B 6/3825 385/76 |
| 2015/0277059 A1* | 10/2015 | Raven | G02B 6/3879 385/78 |
| 2013/0378113 | 12/2015 | Good et al. | |
| 2015/0378113 A1 | 12/2015 | Good et al. | |
| 2016/0116685 A1* | 4/2016 | Wong | G02B 6/3825 385/56 |
| 2016/0216458 A1* | 7/2016 | Shih | G02B 6/3871 |
| 2016/0259135 A1 | 9/2016 | Gniadek | |
| 2017/0023746 A1* | 1/2017 | Good | G02B 6/3831 |
| 2017/0176691 A1* | 6/2017 | Childers | G02B 6/3831 |
| 2017/0254966 A1 | 9/2017 | Gniadek | |
| 2017/0293088 A1* | 10/2017 | Manes | G02B 6/3825 |
| 2017/0293089 A1* | 10/2017 | Gustafson | G02B 6/3821 |
| 2017/0293090 A1* | 10/2017 | Hopper | G02B 6/3821 |
| 2018/0128987 A1* | 5/2018 | Good | G02B 6/3883 |
| 2018/0156988 A1* | 6/2018 | Gniadek | G02B 6/387 |
| 2018/0156999 A1* | 6/2018 | Buff | G02B 6/4452 |
| 2018/0164511 A1* | 6/2018 | Childers | G02B 6/3831 |
| 2018/0172923 A1* | 6/2018 | Bauco | G02B 6/3873 |
| 2018/0172924 A1* | 6/2018 | Bauco | G02B 6/3873 |
| 2018/0172942 A1* | 6/2018 | Bauco | G02B 6/3873 |
| 2018/0217339 A1* | 8/2018 | Ma | G02B 6/3893 |
| 2018/0217340 A1* | 8/2018 | Wong | G02B 6/3893 |

FOREIGN PATENT DOCUMENTS

| | | |
|---|---|---|
| CN | 201383588 Y | 1/2010 |
| CN | 2026500189 U | 12/2013 |
| DE | 202006011910 U1 | 3/2007 |
| DE | 102006019335 A1 | 10/2007 |
| EP | 1211537 A2 | 6/2002 |
| EP | 1245980 A2 | 10/2002 |
| EP | 1566674 A1 | 8/2005 |
| GB | 2111240 A | 6/1983 |
| JP | 2008229545 A | 10/2009 |
| JP | 2009276493 A | 11/2009 |
| TW | 200821653 A | 5/2008 |
| WO | 2001/79904 A2 | 10/2001 |
| WO | 2004/027485 A1 | 4/2004 |
| WO | 2008/112986 A1 | 9/2008 |
| WO | 2009/135787 A1 | 11/2009 |
| WO | 2010-024851 A2 | 3/2010 |
| WO | 2012/136702 A1 | 10/2012 |
| WO | 2012/162385 A1 | 11/2012 |
| WO | 2013/052070 A1 | 4/2013 |
| WO | 2014/028527 A2 | 2/2014 |
| WO | 2014/182351 A2 | 11/2014 |

OTHER PUBLICATIONS

EP Search Report and Opinion dated Feb. 2015 EP 14168005.
Fiber Optic Connectors and Assemblies Catalog 2009 Huber &Suhner.
Fiber Optic Interconnect Solutions Tactical Fiber Optic Connectors, Cables and Termini Glenair, 2006.
Fiber Optic Products Catalog Nov. 2007 Tyco Electronics.
ISR and Opinion dated Apr. 2012, PCT/US2012/058799.
ISR and Opinion dated Aug. 2012, PCT/US2012/039126.
ISR and Opinion dated Jan. 2016, PCT/US2013/54784.
ISR and Opinion dated Aug. 2014, PCT/US2014/041500.
ISR and Opinion dated May 2014, PCT/US2014/012137.
ISR and Opinion dated Aug. 2008, PCT/US2008/057023.
International Preliminary Report on Patentability dated Sep. 2017 from US2015/059458, dated Nov. 6, 2015.
ISR and Opinion dated Apr. 13, 2018 PCT/US2018/016049.
ISR and Opinion dated Feb. 2017, PCT/US2017/13286.
ISR and Opinion dated Aug. 2017, PCT/US2017/40178.
AFOP to introduce LC Slimpac(TM) Uniboot Connectors as high density connector solutions Aug. 26, 2014.

* cited by examiner

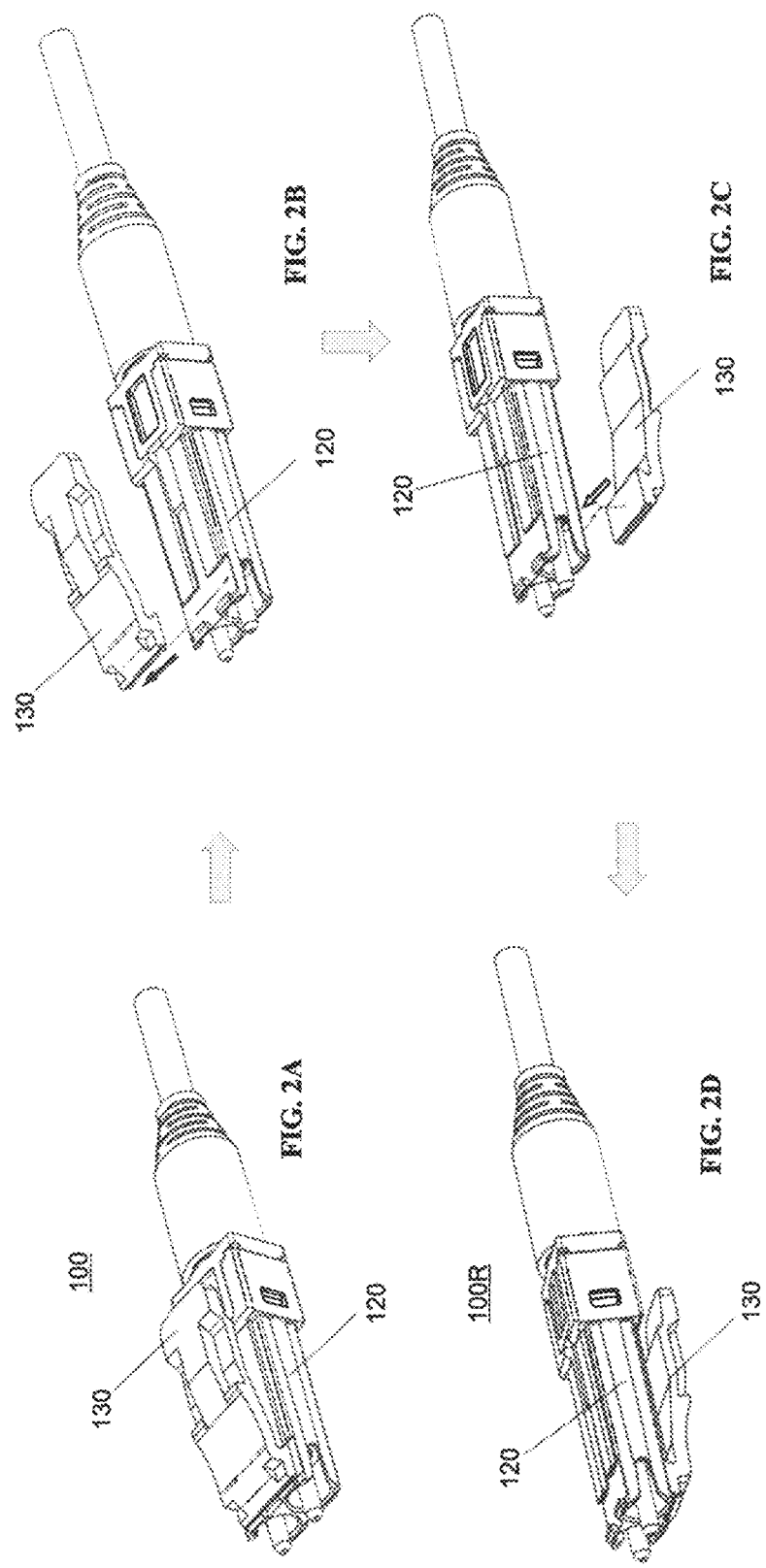

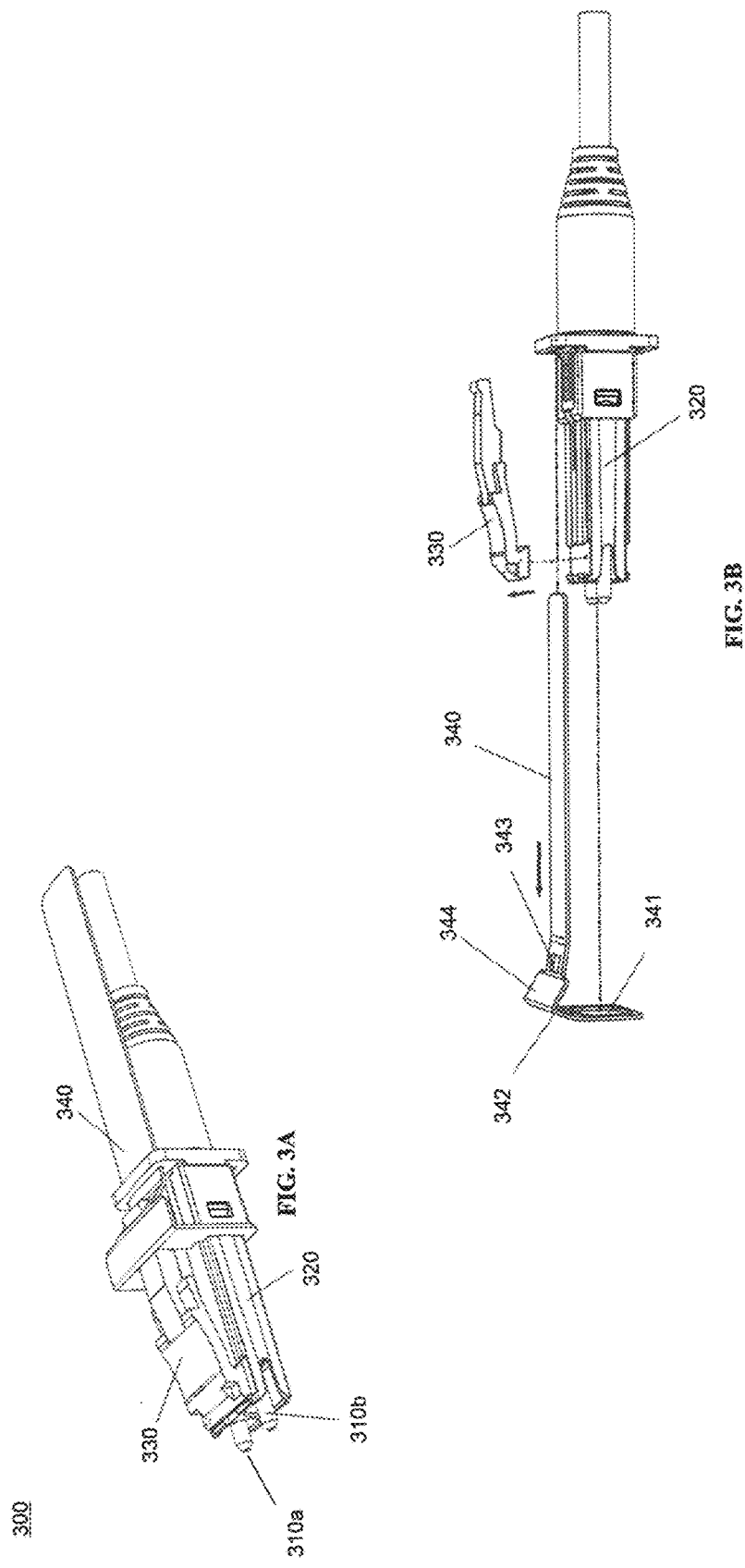

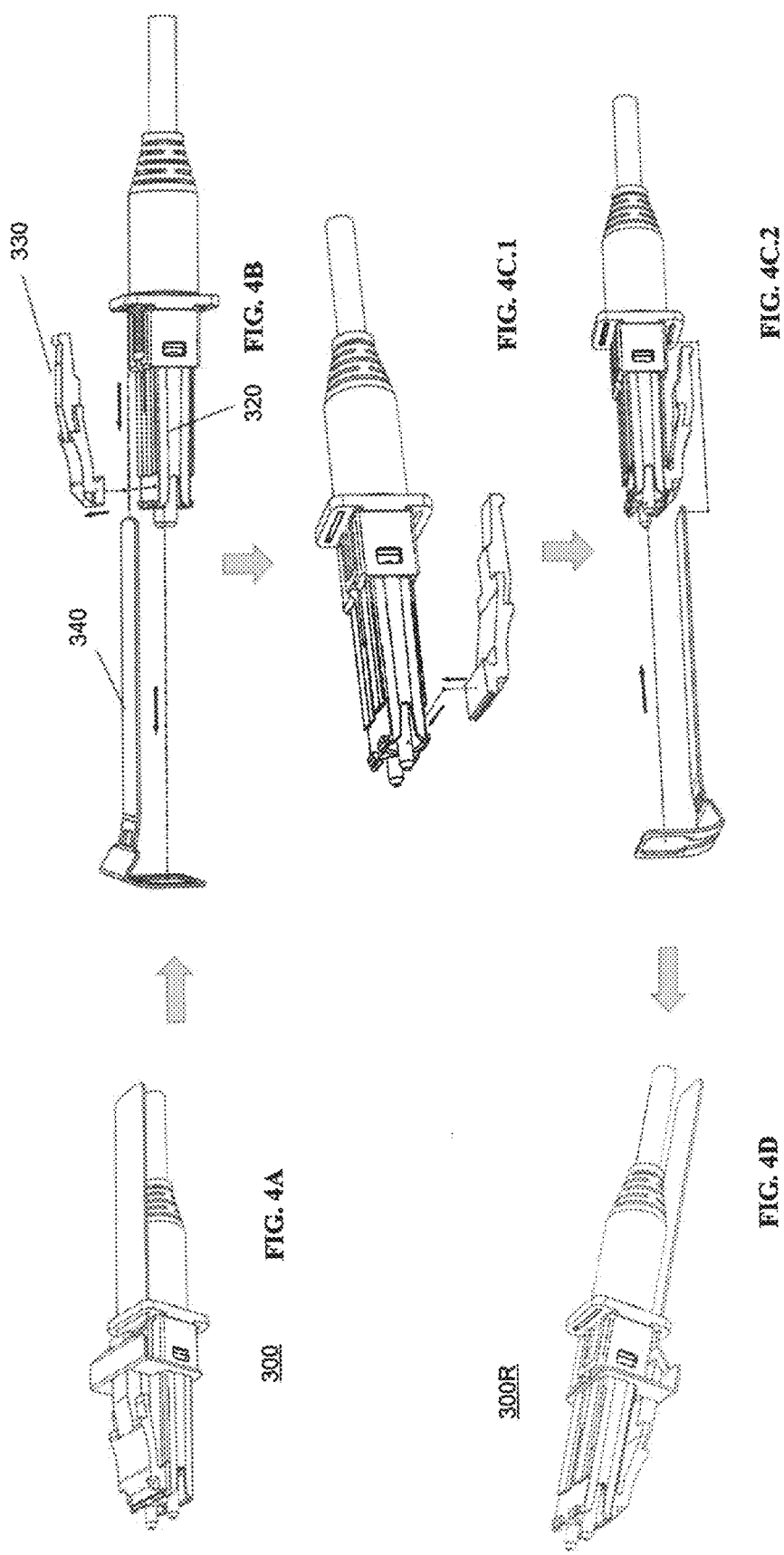

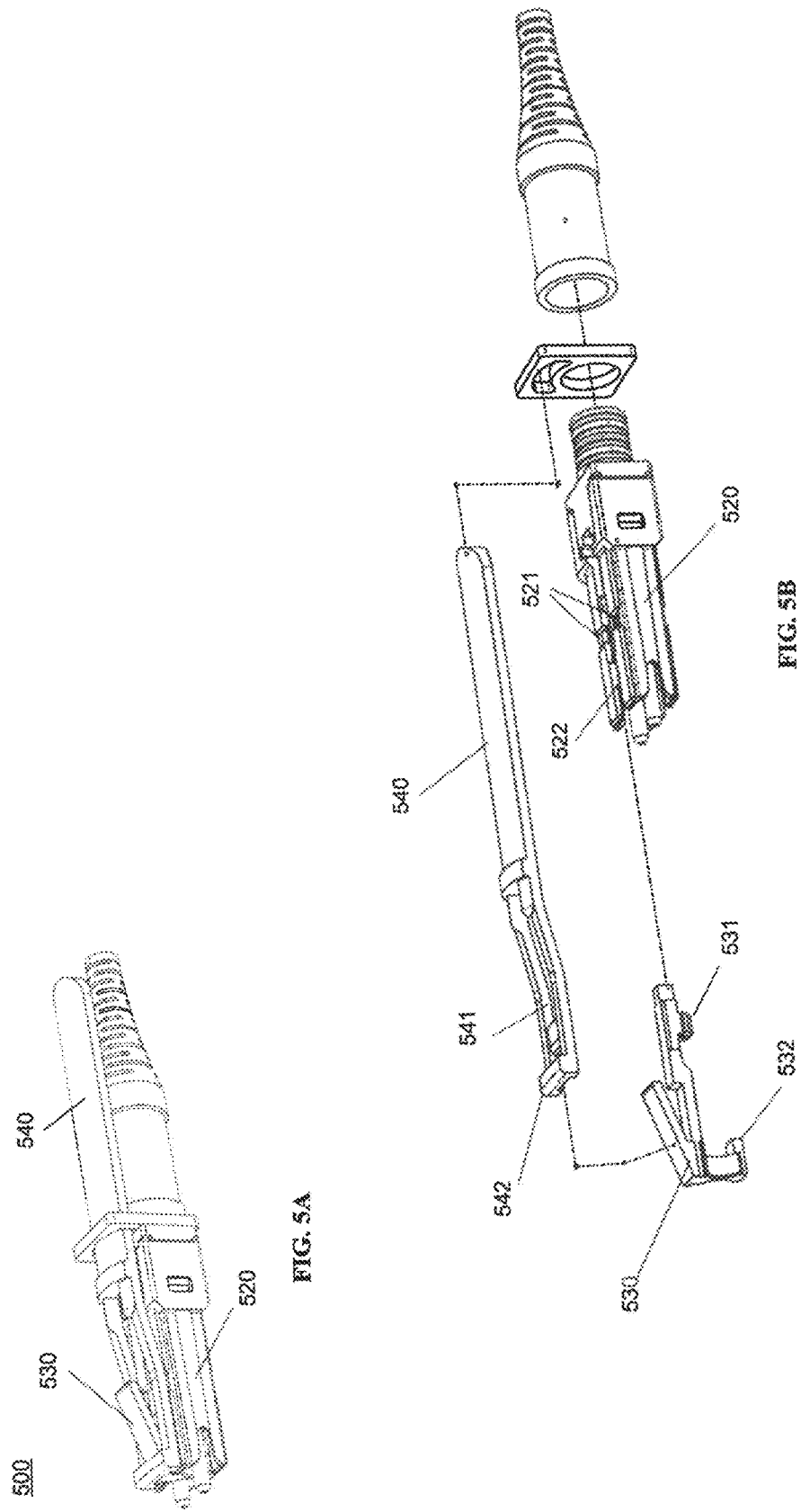

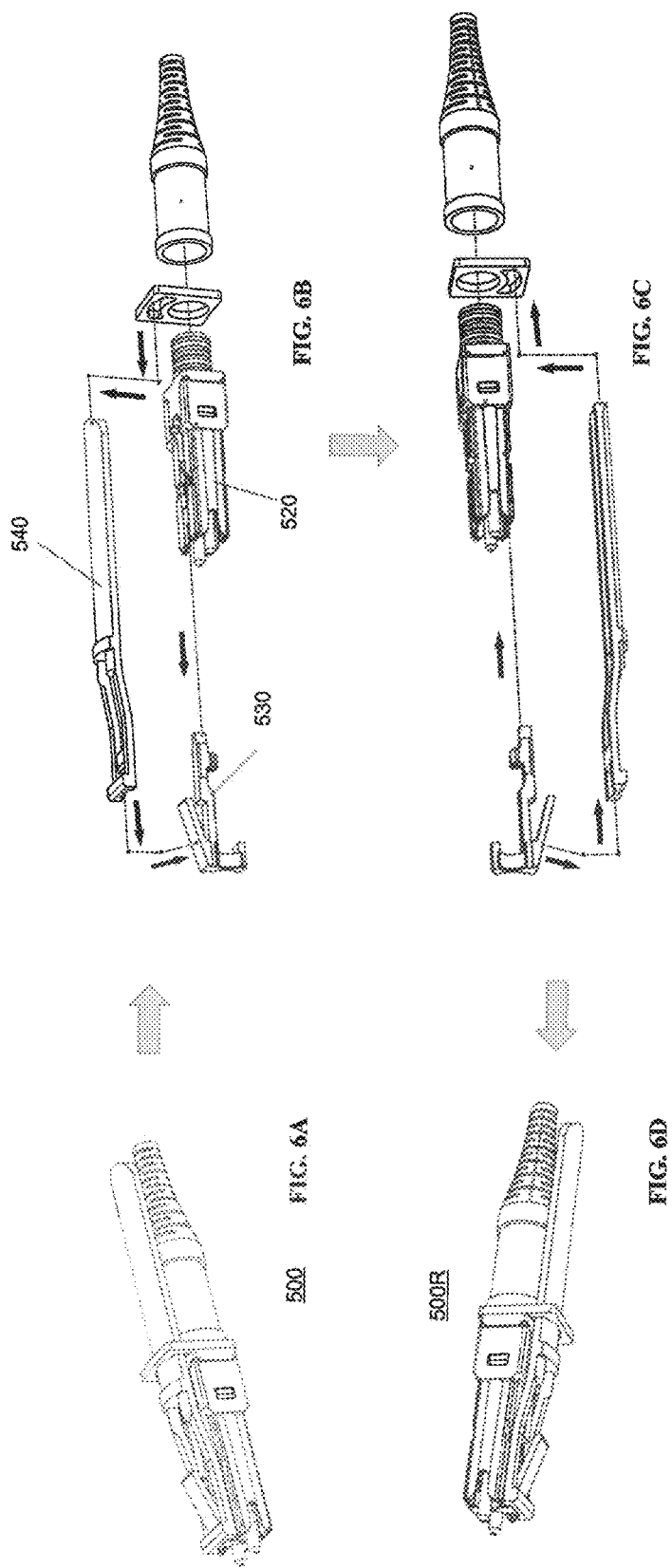

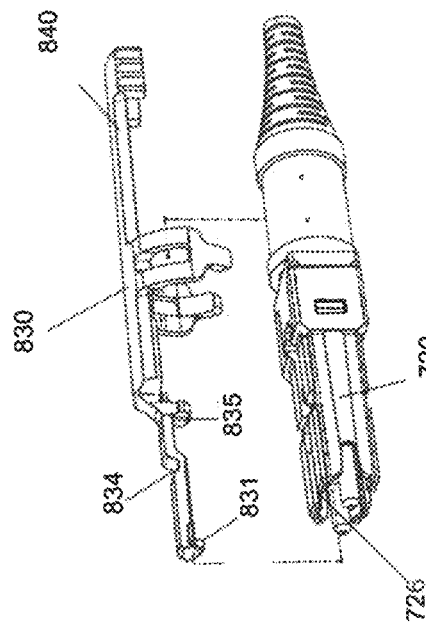
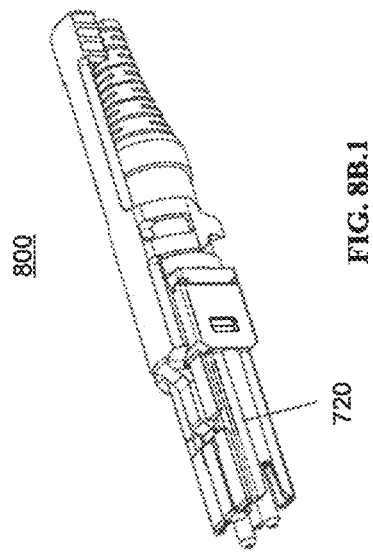
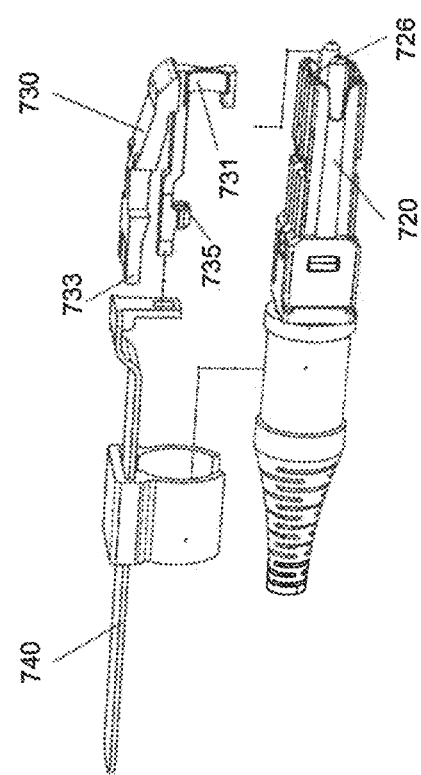
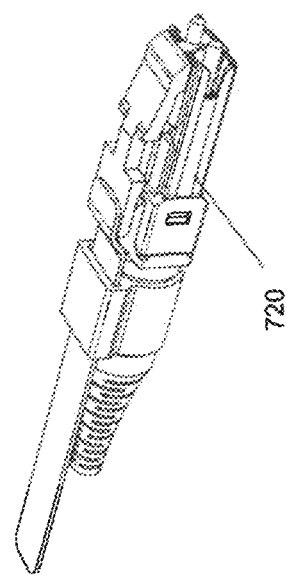
FIG. 8B.2
FIG. 8B.1
FIG. 8A.2
FIG. 8A.1

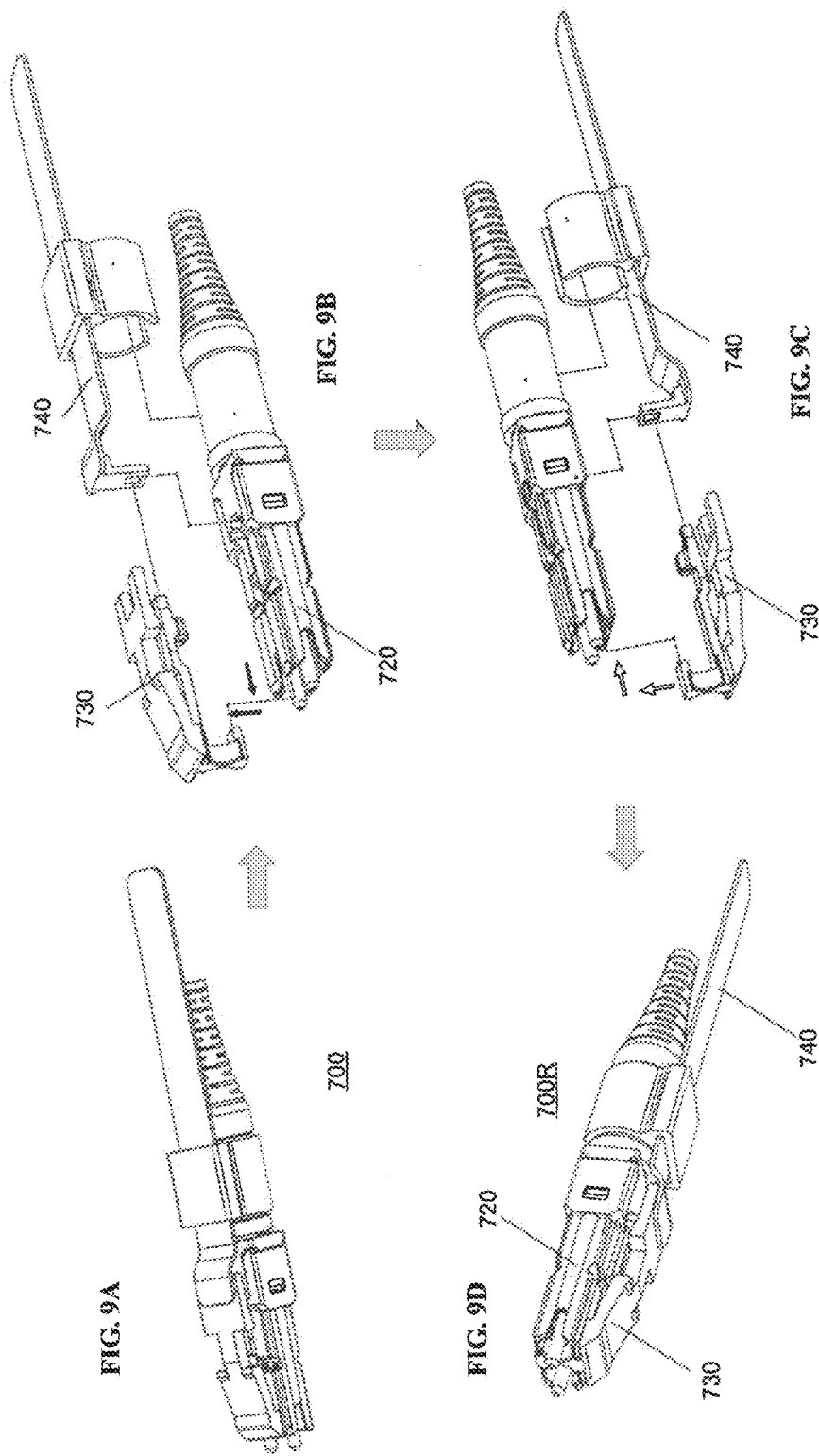

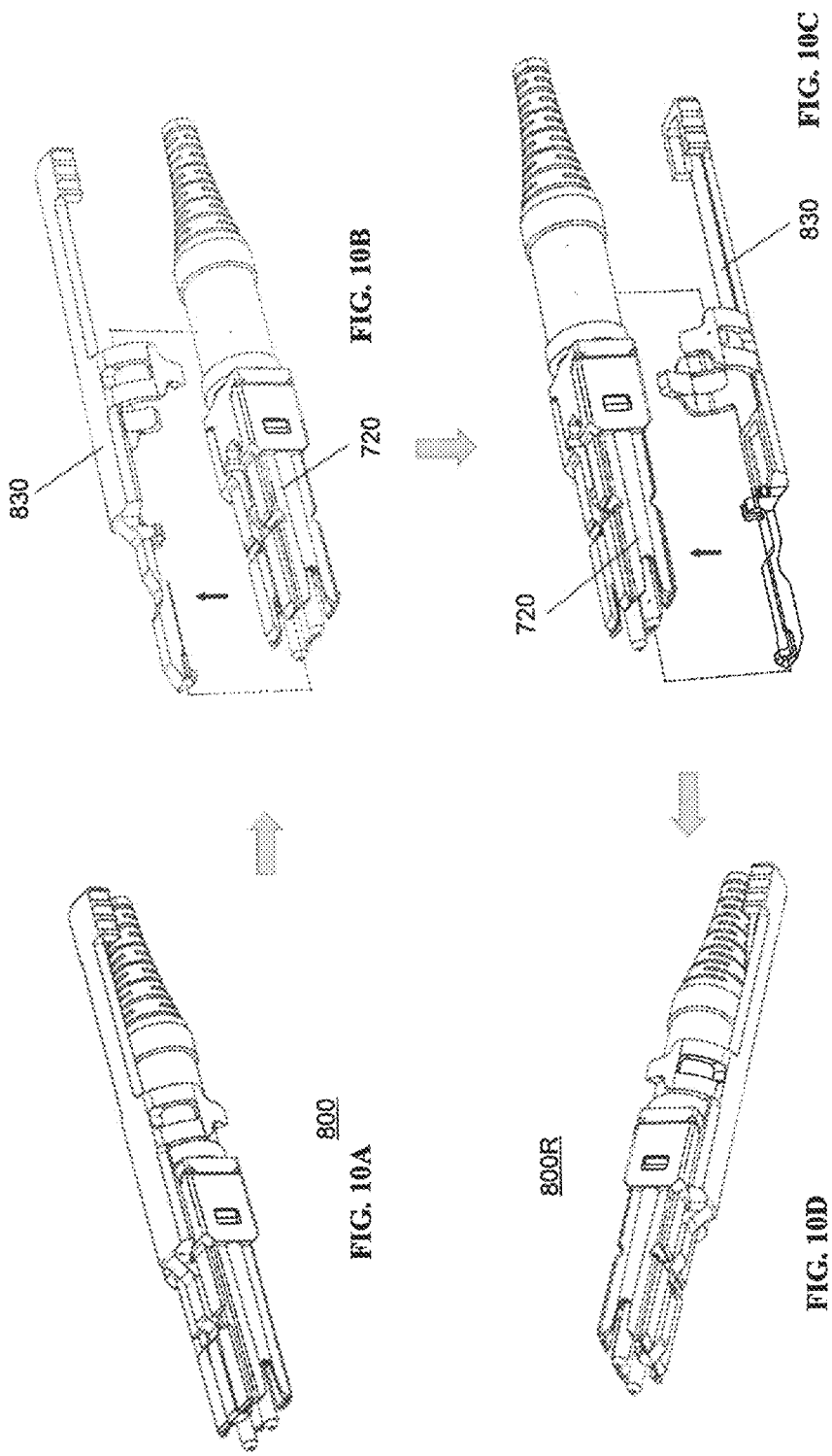

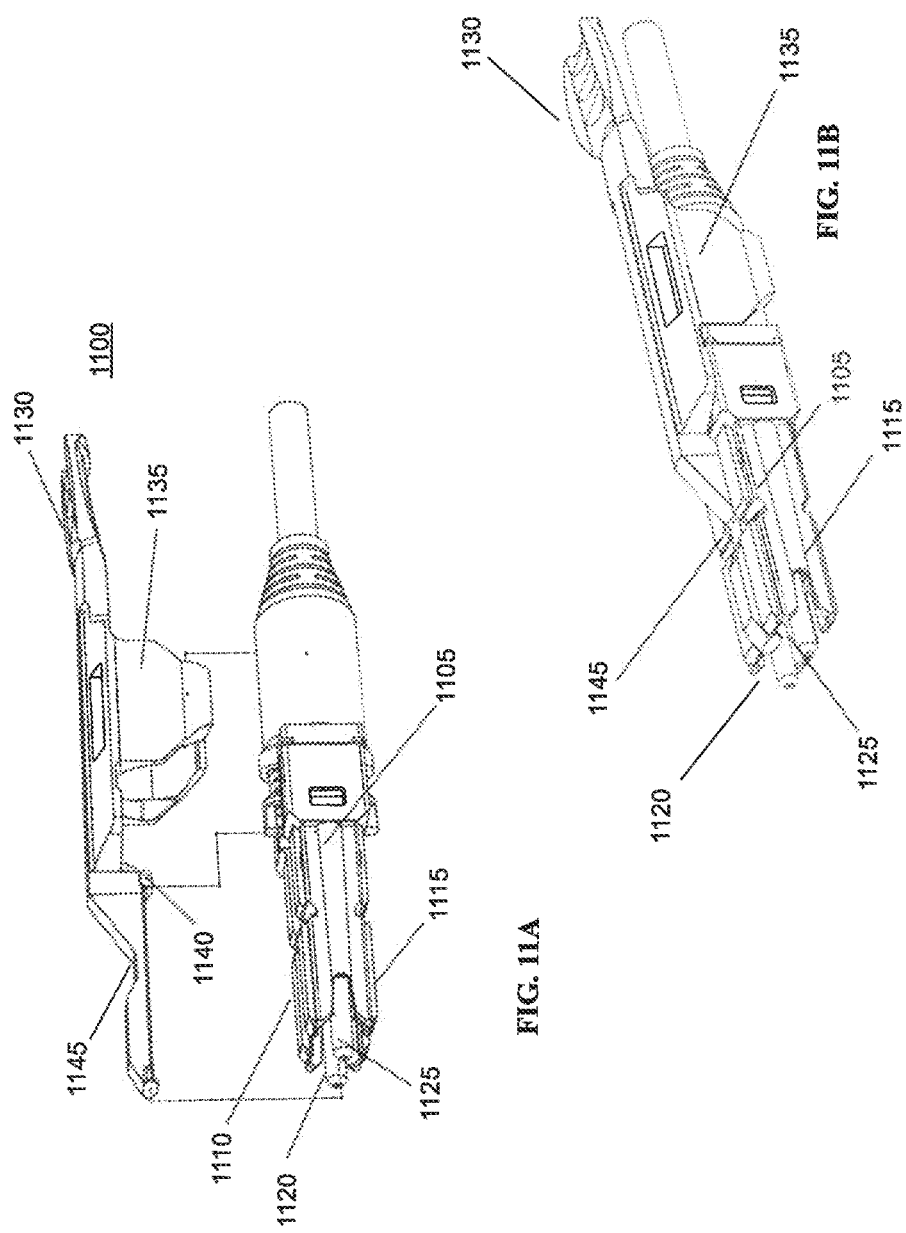

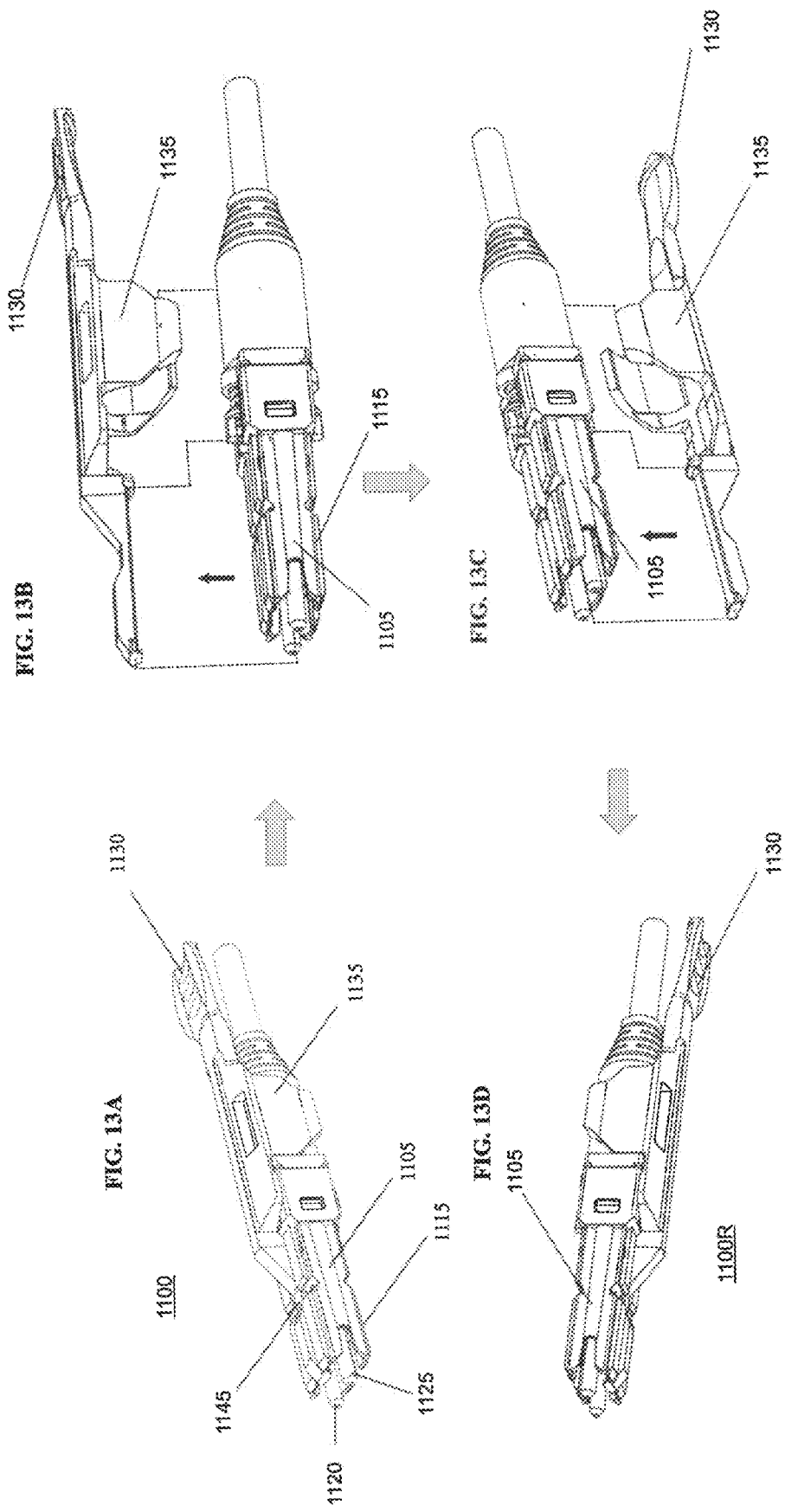

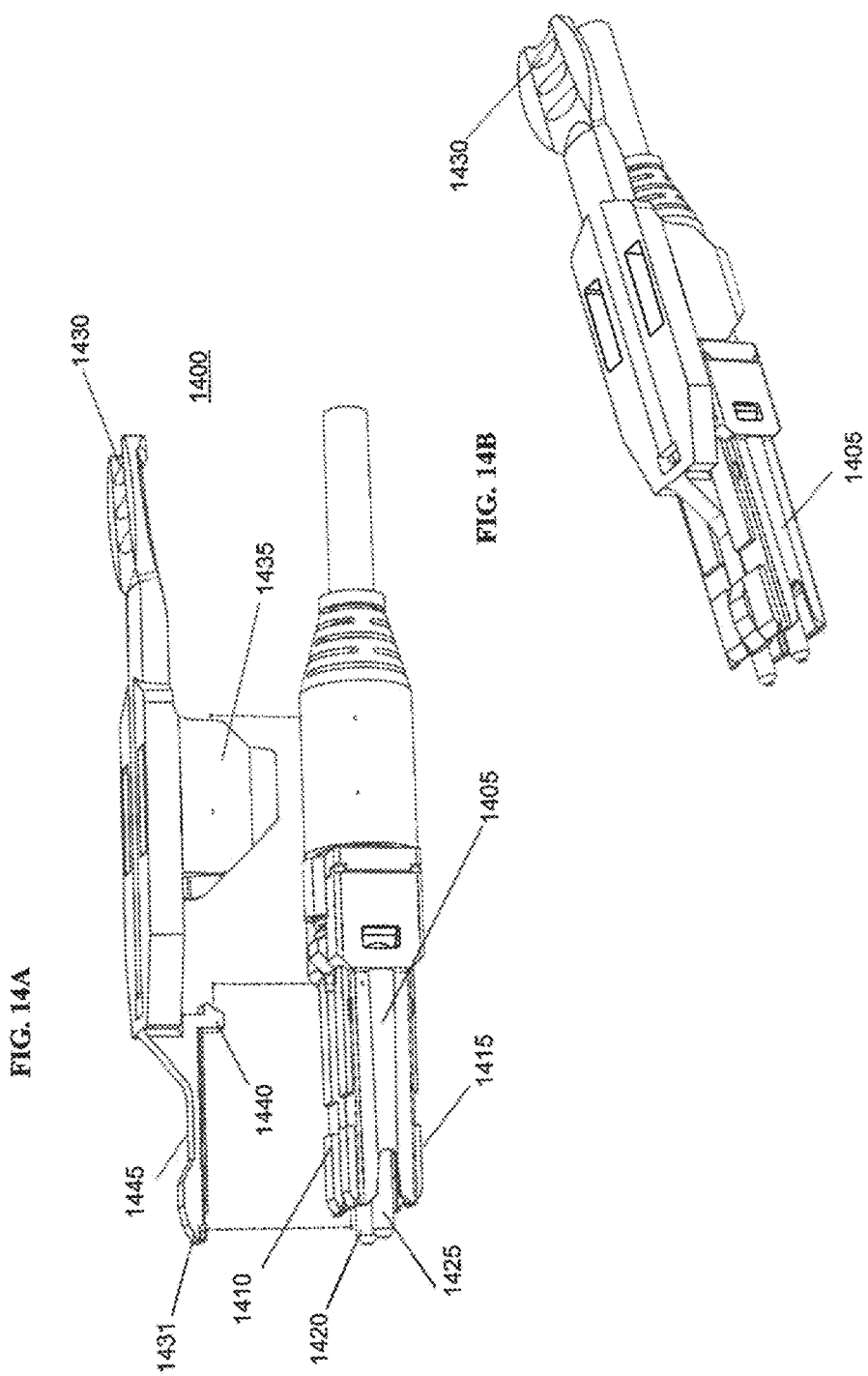

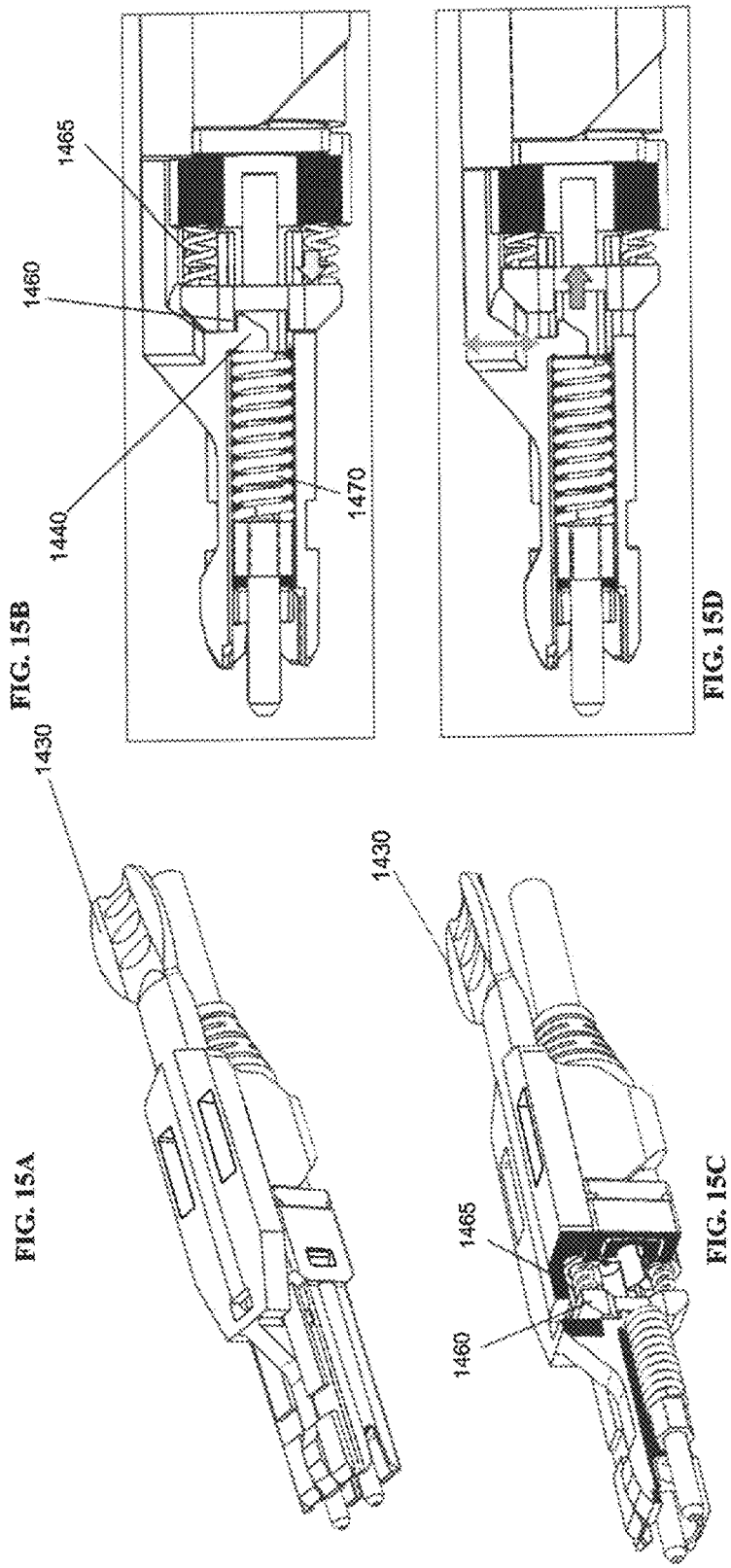

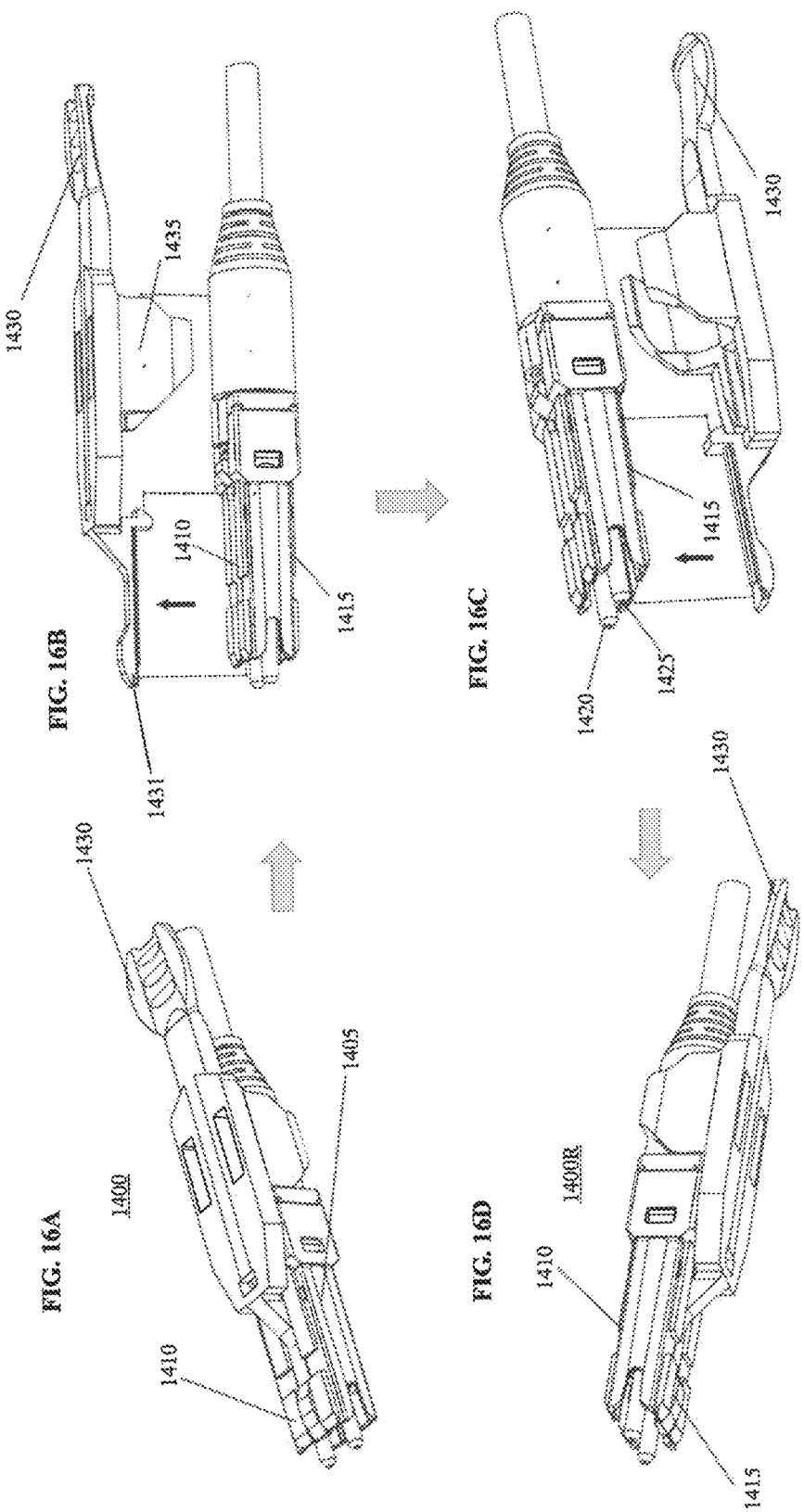

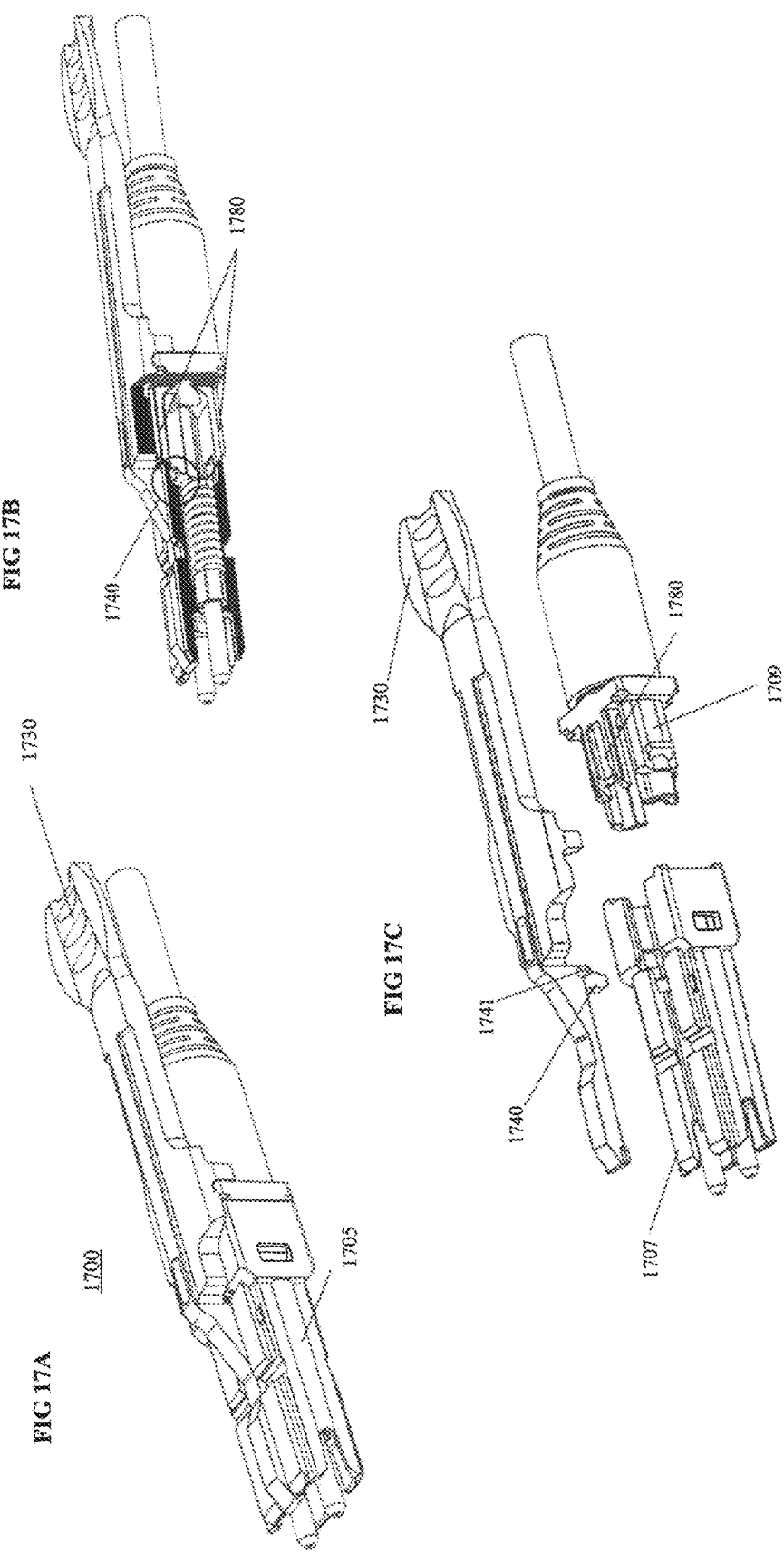

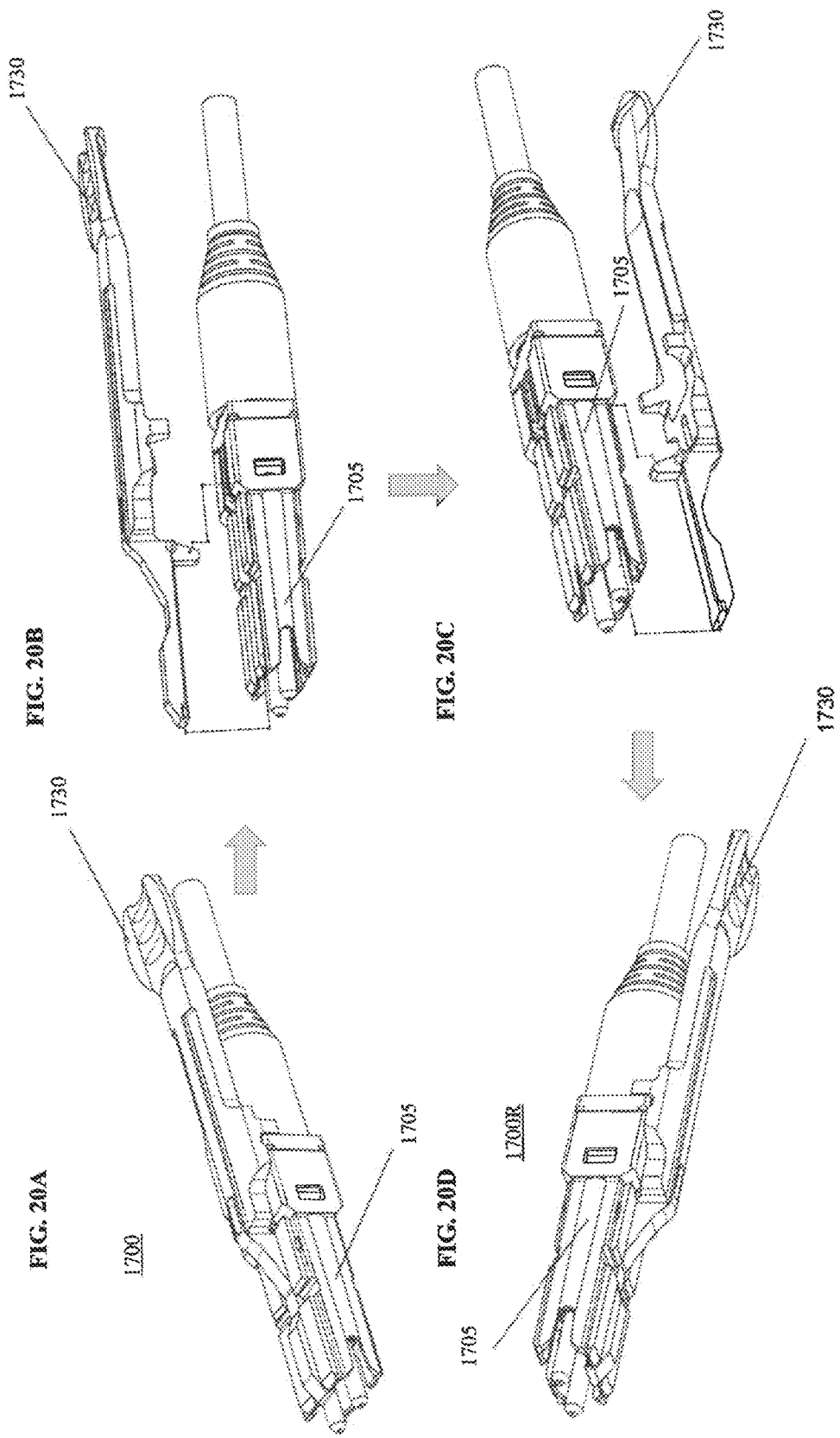

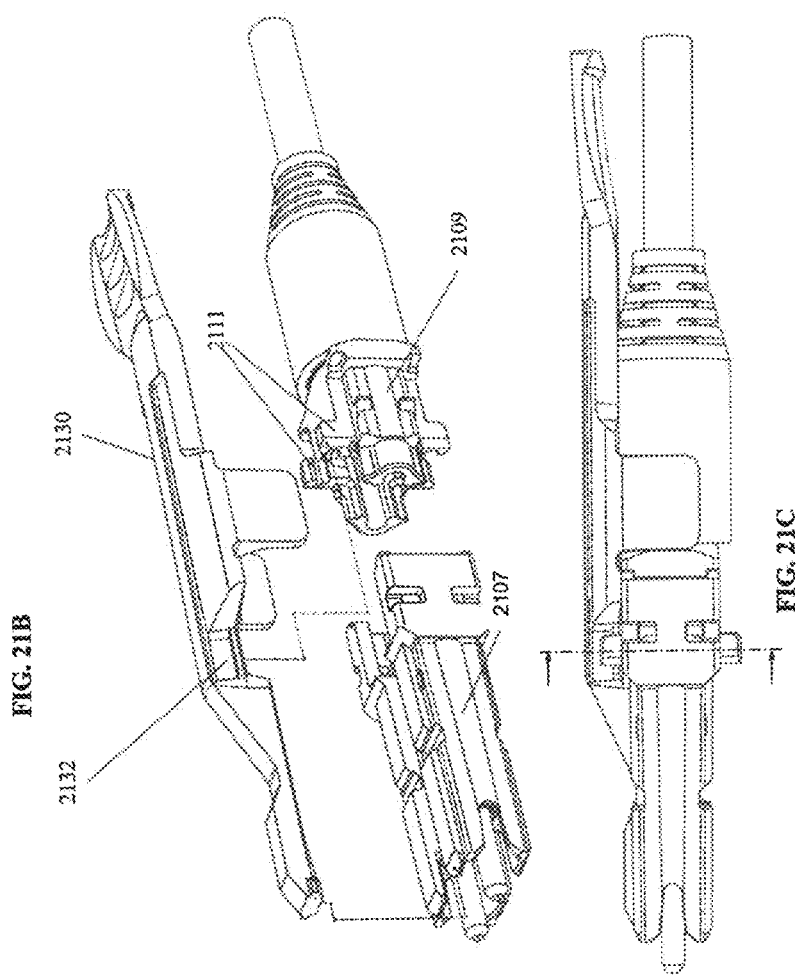
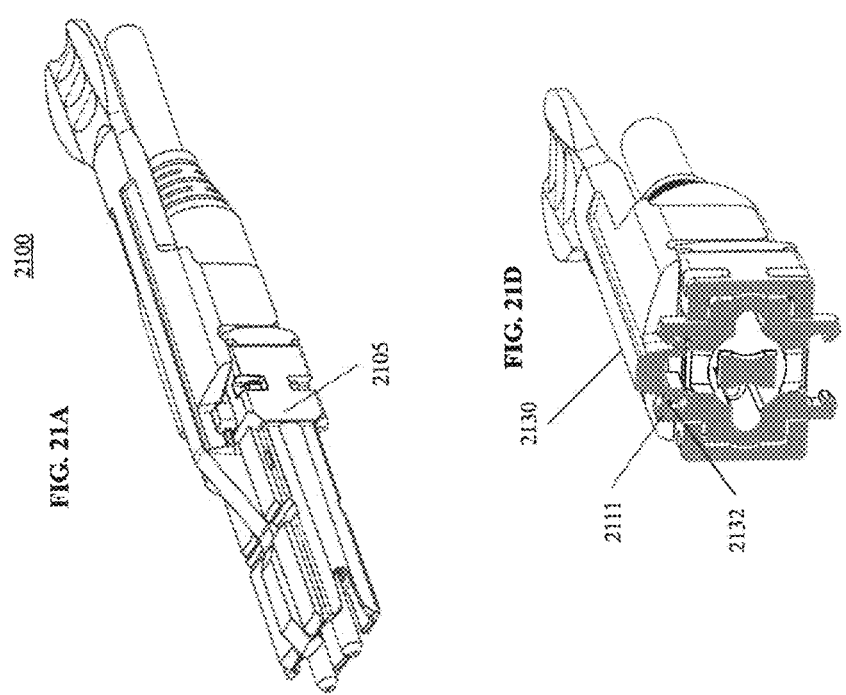

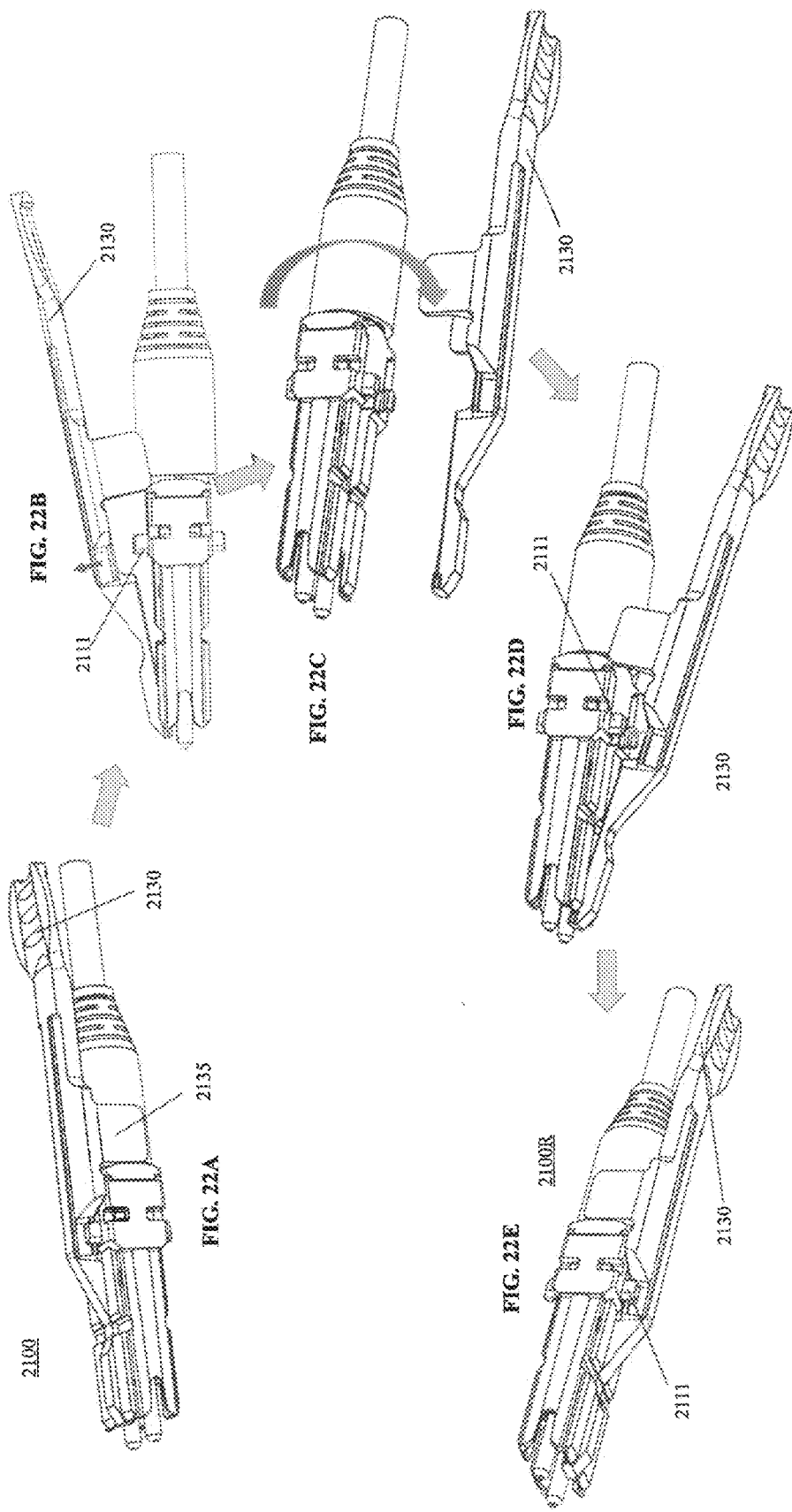

OPTICAL CONNECTORS WITH REVERSIBLE POLARITY

CROSS-REFERENCE TO RELATED PATENT APPLICATIONS

The present application claims priorities to U.S. Provisional Patent Applications No. 62/452,147 filed Jan. 30, 2017, No. 62/457,150 filed Feb. 9, 2017, No. 62/463,898 filed Feb. 27, 2017, No. 62/463,901 filed Feb. 27, 2017, No. 62/485,042 filed Apr. 13, 2017, No. 62/546,920, filed Aug. 17, 2017, and No. 62/581,961 filed Nov. 6, 2017; the disclosures of which are incorporated herein by reference in their entireties.

FIELD OF THE INVENTION

The present disclosure relates generally optical connectors with reversible polarity.

BACKGROUND

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, room for improvement in the area of data centers, specifically as it relates to fiber optic connections, still exists. For example, manufacturers of connectors are always looking to reduce the size of the devices, while increasing ease of deployment, robustness, and modifiability after deployment. In particular, more optical connectors may need to be accommodated in the same footprint previously used for a smaller number of connectors in order to provide backward compatibility with existing data center equipment. For example, one current footprint is known as the small form-factor pluggable footprint (SFP). This footprint currently accommodates two LC-type ferrule optical connections. However, it may be desirable to accommodate four optical connections (two duplex connections of transmit/receive) within the same footprint. Another current footprint is the quad small form-factor pluggable (QSFP) footprint. This footprint currently accommodates four LC-type ferrule optical connections. However, it may be desirable to accommodate eight optical connections of LC-type ferrules (four duplex connections of transmit/receive) within the same footprint.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

In a high-density panel configuration, adjacent connectors and cable assemblies may obstruct access to the individual release mechanisms. Such physical obstructions may impede the ability of an operator to minimize the stresses applied to the cables and the connectors. For example, these stresses may be applied when the user reaches into a dense group of connectors and pushes aside surrounding optical fibers and connectors to access an individual connector release mechanism with his/her thumb and forefinger. Overstressing the cables and connectors may produce latent defects, compromise the integrity and/or reliability of the terminations, and potentially cause serious disruptions to network performance.

Accordingly, there is a need for smaller fiber optic connectors that will meet the needs of future developments in smaller SFPs and are reconfigurable for flexible deployment.

SUMMARY OF THE INVENTION

In a first aspect, the present disclosure provides a reversible polarity fiber optic connector including at least first and second optical ferrules and a connector housing at least partially surrounding the first and second optical ferrules. The housing has a first exterior wall positioned above the first and second optical ferrules and a second exterior wall positioned beneath the first and second optical ferrules. A latch coupling is positioned on each of the first and second exterior walls of the housing. A removable latch may engage either the first or second exterior wall latch coupling on the connector housing. Positioning the removable latch on the first exterior wall yields a fiber optic connector with a first polarity and positioning the removable latch on the second exterior wall yields a fiber optic connector with a second, opposite polarity.

In another aspect, the present disclosure provides a reversible polarity fiber optic connector with exchangeable arms for changing connector type. Thus, a common connector body may be formed into different connector types. The connector includes at least first and second optical ferrules and a common connector housing at least partially surrounding the first and second optical ferrules. The housing has a first exterior wall positioned above the first and second optical ferrules and a second exterior wall positioned beneath the first and second optical ferrules. A coupling surface is positioned on each of the first and second exterior walls of the common connector housing. To create a connector, a removable arm engages either the first or second exterior wall coupling surface; the removable arm includes either a latch or a latch recess depending upon the type of optical connector to be formed. Further, positioning the removable arm on the first exterior wall of the connector housing yields a fiber optic connector with a first polarity and positioning the removable arm on the second exterior surface of the housing yields a fiber optic connector with a second, opposite polarity.

In another aspect, the present disclosure provides a reversible polarity fiber optic connector with a push-pull tab. The connector includes at least first and second optical ferrules and has a connector housing at least partially surrounding the first and second optical ferrules. A first exterior wall is positioned above the first and second optical ferrules and a second exterior wall is positioned beneath the first and second optical ferrules. A first aperture is in the first exterior wall of the housing and a second aperture is in the second exterior wall of the housing. A removable push-pull tab includes a protrusion for positioning within either of the first or second apertures in the first and second exterior walls, respectively, of the connector housing. Positioning the removable push-pull tab with its protrusion within the first aperture yields a fiber optic connector with a first polarity and positioning the removable push-pull tab with its protrusion within the second aperture yields a fiber optic connector with a second, opposite polarity.

In yet another aspect, the present disclosure provides a reversible polarity fiber optic connector including at least first and second optical ferrules and a connector housing at least partially surrounding the first and second optical ferrules. A first exterior wall is positioned above the first and second optical ferrules and a second exterior wall is positioned beneath the first and second optical ferrules. A removable push-pull tab is provided. A first push-pull tab retainer is positioned on the first exterior wall and a second push-pull tab retainer is positioned on the second exterior wall. Positioning the removable push-pull tab in the retainer on the first exterior wall of the connector housing yields a fiber optic connector with a first polarity and positioning the removable push-pull tab in the retainer on the second exterior wall of the housing yields a fiber optic connector with a second, opposite polarity.

BRIEF DESCRIPTION OF THE DRAWINGS

FIG. 2A is a perspective view of the reversible polarity fiber optic connector of FIG. 1A;

FIG. 2B is an exploded view of a step in the process of changing the polarity of the reversible polarity fiber optic connector of FIG. 2A;

FIG. 2C is an exploded view of a next step in the process of changing the polarity of the reversible polarity fiber optic connector of FIG. 2A;

FIG. 2D is a perspective view of the fiber optic connector of FIG. 1A with its polarity reversed;

FIG. 3A is a perspective view of an embodiment of a reversible polarity fiber optic connector with a pull tab according to aspects of the present disclosure;

FIG. 3B is an exploded view of the reversible polarity fiber optic connector of FIG. 3A;

FIG. 4A is a perspective view of the polarity of the reversible polarity fiber optic connector of FIG. 3A;

FIG. 4B is an exploded view of a step in the process of changing the polarity of the reversible polarity fiber optic connector of FIG. 4A;

FIG. 4C.1 is an exploded view of positioning the latch in the process of changing the polarity of the reversible polarity fiber optic connector of FIG. 4A;

FIG. 4C.2 is an exploded view of attaching the removed components of FIG. 4B in the process of changing the polarity of the reversible polarity fiber optic connector of FIG. 4A;

FIG. 4D is a perspective view of the reversible polarity fiber optic connector of FIG. 4A with its polarity reversed;

FIG. 5A is a perspective view of another embodiment of a reversible polarity fiber optic connector with a pull tab according to aspects of the present disclosure;

FIG. 5B is an exploded view of the reversible polarity fiber optic connector of FIG. 5A;

FIG. 6A is a perspective view of the polarity of the fiber optic connector of FIG. 5A;

FIG. 6B is an exploded view of a step in the process of changing the polarity of the reversible polarity fiber optic connector of FIG. 5A;

FIG. 6C is an exploded view of a next step in the process of changing the polarity of the reversible polarity fiber optic connector of FIG. 6A;

FIG. 6D is a perspective view of the reversible polarity fiber optic connector of FIG. 6A with its polarity reversed;

FIG. 8A.1 shows how the common connector housing of FIG. 7A is used to create a latch-type connector;

FIG. 8A.2 is an exploded view of FIG. 8A.1;

FIG. 8B.1 shows how the common connector housing of FIG. 7A is used to create a recess-type connector;

FIG. 8B.2 is an exploded view of FIG. 8B.1;

FIG. 9A is a perspective view of FIG. 8A.1 of the polarity of the latch-type fiber optic connector of FIG. 8A.1;

FIG. 9B is an exploded view of a step in the process of changing the polarity of the reversible polarity fiber optic connector of FIG. 8A.1;

FIG. 9C is an exploded view of a next step in the process of changing the polarity of the reversible polarity fiber optic connector of FIG. 8A.1;

FIG. 9D is a perspective view of the reversible polarity fiber optic connector of FIG. 8A.1 with its polarity reversed;

FIG. 10A is a perspective view of FIG. 8B.1 of the polarity of the recess-type fiber optic connector of FIG. 8B.1;

FIG. 10B is an exploded view of a step in the process of changing the polarity of the reversible polarity fiber optic connector of FIG. 8B.1;

FIG. 10C is an exploded view of a next step in the process of changing the polarity of the reversible polarity fiber optic connector of FIG. 8B.1;

FIG. 10D is a perspective view of the reversible polarity fiber optic connector of FIG. 8B.1 with its polarity reversed;

FIGS. 11A and 11B respectively depict exploded and perspective views of a reversible polarity optical connector according to a further embodiment of the disclosure;

FIGS. 13A-13D depict the process for changing the polarity of the optical connector of FIGS. 11A and 11B;

FIGS. 14A and 14B respectively depict exploded and perspective views of a reversible polarity optical connector according to a further embodiment of the disclosure;

FIGS. 15-15D depict the operation of the reversible polarity optical connector of FIGS. 14A and 14B;

FIGS. 16A-16D depict the process for changing the polarity of the optical connector of FIGS. 14A and 14B;

FIGS. 17A-17C respectively depict perspective, partial cross-section, and exploded views of a reversible polarity optical connector according to a further embodiment of the disclosure;

FIGS. 20A-20D depict the process for changing the polarity of the optical connector of FIGS. 17A-17C.

DETAILED DESCRIPTION

Figure 1A:
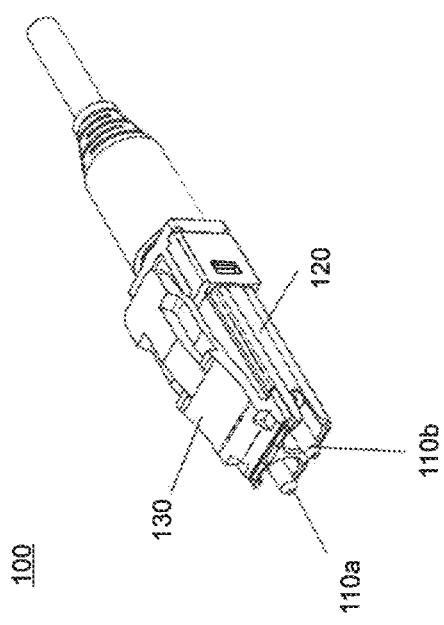
FIG. 1A is a perspective view of one embodiment of a reversible polarity fiber optic connector according to some aspects of the present disclosure.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

The connectors of the present disclosure may be configured for fiber optic transmission or electrical signal transmission. The connector may be any suitable type now known or later developed, such as, for example, a ferrule connector (FC), a fiber distributed data interface (FDDI) connector, an LC connector, a mechanical transfer (MT) connector, a square connector (SC) connector, an SC duplex connector, or a straight tip (ST) connector. The connector may generally be defined by a connector housing. In some embodiments, the housing may incorporate any or all of the components described herein.

Various embodiments described herein generally provide a remote release mechanism such that a user can remove cable assembly connectors that are closely spaced together without damaging surrounding connectors, accidentally disconnecting surrounding connectors, disrupting transmissions through surrounding connectors, and/or the like. Various embodiments also provide narrow pitch LC duplex connectors and narrow width multi-fiber connectors.

As discussed herein, current connectors may be improved by various means, such as, for example, reducing the footprint, increasing the structural strength, enabling polarity changes, etc. Various embodiments disclosed herein offer improvements over the current state of the art, as will be further discussed below.

In some embodiments, the fiber optic connector may be a narrow pitch duplex LC connector including two LC connectors. In some embodiments, such as that shown, the two LC connectors may comprise a single combined unit. In alternative embodiments, the LC connectors may be separate members, wherein an air gap exists between the two members, or wherein the two separate members are located adjacent and flush to each other (i.e., no air gap exists). In some embodiments, each of the LC connectors includes a respective ferrule and a respective extending member or modular arm. The connector may have a pitch of 4.8 mm, defined as the axis-to-axis distance between the central axes of the LC connectors. In other embodiments, the connector pitch may be less than that of the pitch of conventional connectors, for example less than 6.25 mm and less than about 5.25 mm. In some embodiments, the pitch may be about 4.8 mm or less.

In current designs, if a fiber optic connector, particularly a duplex connector, needs to have the ferrules rotated or swapped, for example, for exchanging transmit and receive optical fibers, it can be a time consuming and difficult process. Generally, if a duplex connector needs to be rotated, current systems require twisting the individual LC connector tips 180 degrees. However, this process also twists the fibers that enter the connector tip. Twisting the fiber at any stage of the connection can cause wear and/or damage to the delicate fibers. Thus, most systems involve an alternative solution, wherein the duplex connector is partially or completely disassembled in order to access the ferrules or fibers and manually relocate them within the duplex connector. However, swapping ferrules side to side is a delicate operation. In order to prevent damage to the internal fibers, great care must be taken. Thus, this operation usually requires specialized tools and preparation time to perform safely and accurately.

Therefore, embodiments as described herein, allow for easy, quick, and safe swapping of the left and right side ferrules in a connector. Thus, embodiments discussed herein allow for a change in polarity of the duplex connector without twisting the fibers or performing any complex disassembly of the duplex connector.

Figure 1B:
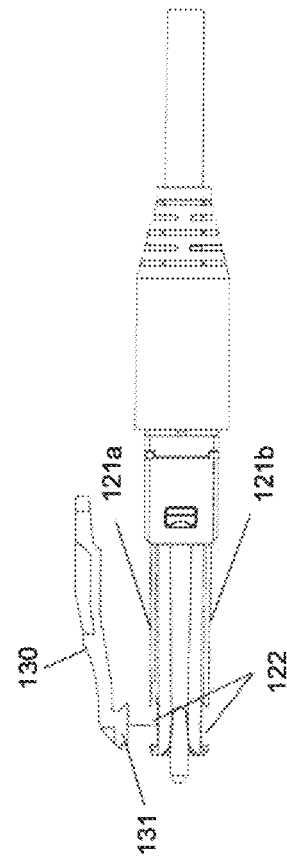
FIG. 1B is a side view of the reversible polarity fiber optic connector of FIG. 3A with the removable latch being removed from the connector housing.

FIGS. 1A and 1B depict a fiber optic connector with reversible polarity according to one aspect of the present disclosure. As shown in FIG. 1A, a reversible polarity fiber optic connector may include first and second optical ferrules 110a and 110b and a connector housing 120 at least partially surrounding the first and second optical ferrules. A removable latch 130 is depicted in FIG. 1A in its assembled state and in FIG. 1B removed from the connector housing 120.

FIG. 1B is a side view of the reversible polarity fiber optic connector of FIG. 1A with the removable latch 130 being separated from the connector housing. As shown, the connector housing 120 may have a first exterior wall 121a positioned above the first and second optical ferrules and a second exterior wall 121b positioned beneath the first and second optical ferrules. A latch coupling 122 is positioned on each of the first and second exterior walls of the housing. The removable latch 130 may include a protrusion 131 for engaging the housing latch coupling 122. In particular, the latch coupling 122 may include angled walls that interact with slanted edges of the protrusion 131 to prevent accidental disassembly of the latch 130. Although the latch coupling 122 is depicted as a recess on the housing accommodating a latch protrusion, these elements may be reversed with the latch including a recess and the housing including a protrusion. Other mechanical coupling mechanisms may be used to interconnect the housing and the removable latch. For example, an embodiment may involve a coupling system wherein the removable latch is inserted into a recess in the connector housing and twisted (e.g., 90°, 180°, etc.) to secure the latch to the recess. Alternative coupling may use a more complex shape. For example, a u-shaped recess in the connector housing may engage a cooperatively-shaped projection in the latch that is inserted and fed through the u-shape until secure. It should thus be understood, that any system or method of coupling may be used to attach the removable latch to the connector housing, including various locations (e.g., sliding from the front, sides, back, bottom, top, etc.).

FIGS. 2A-2D depict the process for changing the polarity of the fiber optic connector of FIG. 1A from a first polarity, FIG. 2A to a second, opposite polarity, FIG. 2D. The removable latch 130 may be removed from the latch coupling on the first exterior wall of the connector housing, FIG. 2B, positioned adjacent the second exterior wall on beneath the ferrules, FIG. 2C, and then coupled with the latch coupling on the second exterior wall of the connector housing to yield a connector 100R, FIG. 2D, having the opposite polarity of connector 100. In this manner, transmit and receive optical fibers may be reversed without necessitating any fiber twist or complex repositioning of the optical ferrules.

In typical embodiments, the latch of the connector housing is required to be flexible. Thus, when a latch and a connector housing (e.g., duplex connector) are built as one unified member (as is currently done), the fiber optic connector is built of a similar flexible or less rigid material. Building the connector housing out of a plastic or polymeric material, limits the amount of rigidity that it can have. Thus, as fiber optic connectors continue to reduce in size, the strength of the housing has been reduced. Therefore, it would be advantageous to build the connector housing out of a more robust material while still allowing the latch to remain flexible. In order to accomplish this, in some embodiments according to aspects of the present disclosure, the connector housing may be manufactured out of a very rigid or strong material (e.g., steel, graphene, carbon, metal alloys, or any material of suitable properties). Because the connector housing and the removable latch need only interlock with each other, the removable latch may still be made out of a more flexible material. Thus, the removable nature of the latch disclosed herein allow for a more robust and secure overall design when dealing with the shrinking footprint of fiber optic connectors.

FIG. 3A is a perspective view of another embodiment of a reversible polarity fiber optic connector 300. As shown, the reversible polarity fiber optic connector may further comprise a pull tab 340 for engaging a removable latch 330. The pull tab 340 depresses the latch 330 as the tab is pulled in a direction away from the fiber optic ferrules.

FIG. 3B is an exploded view of the reversible polarity fiber optic connector of FIG. 3A. As shown, the pull tab 340 may comprise a first opening 341 and a second opening 344. The first opening 341 is configured to allow the connector housing and the removable latch to pass through while the second opening is configured to accommodate the tip of the latch. The pull tab may further comprise a first deformable portion 342 and a second deformable portion 344. In operation, the first deformable portion 342 cooperates with the second deformable portion 344 to depress the removable latch when the pull tab is pulled in a direction away from the ferrules.

FIGS. 4A-4D depict the process for changing the polarity of the fiber optic connector 300 from a first polarity, FIG. 4A to a second polarity 300R, FIG. 4D. The pull tab 340 may be disengaged from the connector housing 320 and the removable latch 330 on the first exterior wall of the connector housing, FIG. 2B. The removable latch is then detached from the latch coupling on the first exterior wall of the connector housing, FIG. 4C.1. Next, the removable latch is engaged with the latch coupling on the second exterior wall of the connector housing, beneath the ferrules, FIG. 4C.2. Finally, the pull tab 340 is positioned surrounding the connector housing and engaging the removable latch tip, resulting in the assembled optical connector 300R having polarity opposite to that of connector 300, FIG. 4D.

FIGS. 5A and 5B are a perspective view and exploded view, respectively, of another embodiment of a reversible polarity fiber optic connector 500. The connector 500 includes a connector housing 520, a latch 530, and a pull tab 540. On the first and second exterior walls of connector housing 520 are latch couplings that include a groove 522. A recess 521 is also provided in the housing. The latch 530 includes a protrusion 531 that is received within groove 522. The latch further includes a projection 532 that is received in the housing between the optical ferrules. The pull tab 540 includes an opening 541 for engaging the removable latch 530. A front protrusion 542 is configured to depress the removable latch 530 when the pull tab is pulled in a direction away from the ferrule side of the optical connector.

FIGS. 6A-6D depict the process for changing the polarity of the fiber optic connector 500 from a first polarity, FIG. 6A to a second polarity, FIG. 6D. The pull tab 540 is disengaged from the connector housing and the removable latch 530 on the first exterior wall of the connector housing, FIG. 6B, and the removable latch is decoupled from the latch coupling on the first exterior wall of the connector housing. Then the removable latch may be coupled with the latch coupling on the second exterior wall of the connector housing, beneath the optical ferrules in FIG. 6C, and the pull tab 540 is engaged with the connector housing and the removable latch on the second exterior wall of the connector housing to create reverse polarity connector 500R, FIG. 6D.

It is of interest within the optical connectivity industry to have multiple styles of optical connectors for multiple purposes and/or multiple implementation styles. Thus, in order to more easily provide flexibility, a solution is needed that allows for on-the-fly, in-the-field, or in manufacturing modification of the connector. The below embodiment provides a universal type fiber optic connector which has a unique housing design that allows for different latches or arms to be attached.

Figure 7C:
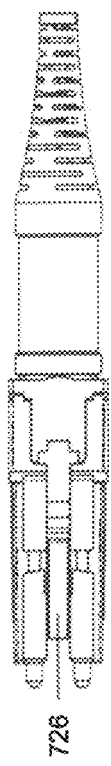
FIG. 7C is the top view of the common connector housing of FIG. 7A.
Figure 7D:
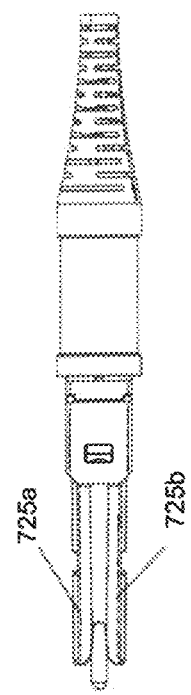
FIG. 7D is the side view of the common connector housing of FIG. 7A.
Figure 7A:
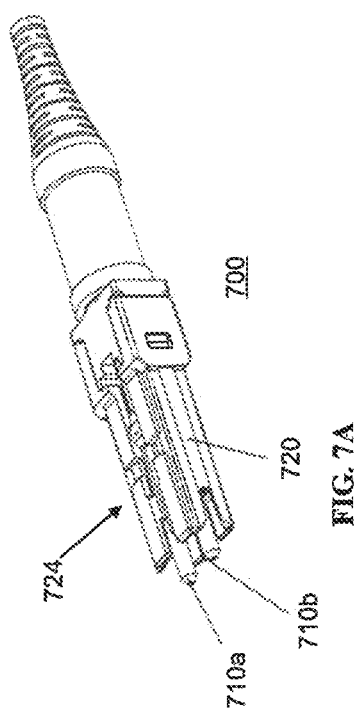
FIG. 7A is a perspective view of a common connector housing of a reversible polarity fiber optic connector with exchangeable arms for changing connector type in an embodiment according to aspects of the present disclosure.

FIG. 7A is a perspective view of a common connector housing 720 of a reversible polarity fiber optic connector 700 with exchangeable arms for changing connector type in an embodiment according to aspects of the present disclosure. As shown, the reversible polarity fiber optic connector may comprise first and second optical ferrules 710a and 710b and the common connector housing 720 at least partially surrounding the first and second optical ferrules.

Figure 7B:
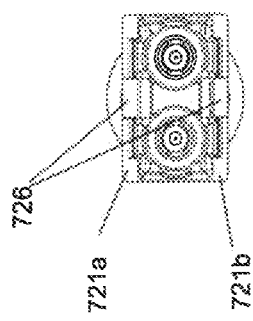
FIG. 7B is the front view of the common connector housing of FIG. 7A.

FIGS. 7B, 7C and 7D are the front view, top view and side view, respectively, of the common connector housing 720. As shown, the common connector housing may have a first exterior wall 725a positioned above the first and second optical ferrules and a second exterior wall 725b positioned beneath the first and second optical ferrules. The connector housing 720 may further have a coupling surface 724 positioned on each of the first and second exterior walls and include a receiving track 726 in the coupling surface.

FIG. 8A.1 shows the common connector housing 720 used to create a latch-type connector 700 and FIG. 8B.1 shows the common connector housing 720 used to create a recess-type connector 800. Both of connectors 700 and 800 include a removable arm 730 or 830 for engaging either of the first and second exterior wall coupling surfaces 724 on the connector housing, FIGS. 8A.2 and 8B.2 respectively. The removable arms 730 and 830 may each respectively include a projection 735 or 835 for engaging in the receiving track 726 of the coupling surface 724, FIGS. 8A.2 and 8B.2 respectively. As with the previous embodiments, positioning the removable arm on the first exterior wall of the connector housing yields a fiber optic connector with a first polarity and positioning the removable arm on the second exterior surface of the housing yields a fiber optic connector with the opposite polarity.

Still referring to FIGS. 8A.2 and 8B.2 respectively the removable arms may include either a latch or a recess: removable arm 730 includes a latch 733 while removable arm 830 includes a recess 834. Thus, a latch-type connector 700 is created through assembly of the removable latch arm to the common connector body 720 as shown in FIG. 8A.1 and a recess-type connector 800 is created through assembly of the removable recess arm to the common connector body 720 as shown in FIG. 8B.1.

The fiber optic connector may further include a pull tab. When a removable arm with a latch 730 is positioned on the coupling surface of the common connector housing 720 to create a latch-type connector 700, the pull tab 740 is a separate element from the removable arm, FIG. 8A.2. When a removable arm includes a recess 830 is positioned on the coupling surface of the common connector housing 720 to create a recess-type connector 800, the pull tab 840 is integrated with the removable arm, FIG. 8B.2.

FIGS. 9A-9D depict the process for changing the polarity of the latch-type fiber optic connector from a first polarity 700, FIG. 9A to a second polarity 700R, FIG. 9D. The sub-assembly of the removable arm 730 and the pull tab 740 may be decoupled from the coupling surface 724 of the first exterior wall of the connector housing, FIG. 9B. Then the sub-assembly of the removable arm 730 and the pull tab 740 may be coupled with the coupling surface of the second exterior wall of the connector housing, FIG. 9C, creating the opposite polarity connector 700R.

FIGS. 10A-10C depicts the process for changing the polarity of the recess-type fiber optic connector 800 from a first polarity, FIG. 10A to a second polarity, FIG. 10D. The removable arm 830 with a recess and a pull tab as an integral structure may be decoupled from the coupling surface 724 of the first exterior wall of the connector housing, FIG. 10B. Then the removable arm may be coupled with the coupling surface 724 of the second exterior wall of the common connector housing 720, FIG. 10C to create opposite polarity optical connector 800R, FIG. 10D.

FIGS. 11A and 11B depict a further embodiment 1100 of the reversible polarity optical connectors of the present disclosure. In FIG. 11A, a push-pull tab 1130 may interconnect with either a first exterior wall 1110 of housing 1105 or with a second exterior wall 1115 of housing 1105. Ferrules 1120 and 1125 are at least partially surrounded by housing 1105 and may be LC connectors in an embodiment. As in previous embodiments, the push-pull tab may include a tab recess 1145. Alternatively, push-pull tab 1130 may include a latch (not shown). Various features of the push-pull tab 1130 are provided to assist in affixing the push-pull tab to the first exterior wall 1110 or the second exterior wall 1115 of the housing 1105. This includes push-pull tab clips 1135 that clip onto the optical connector, optionally in a boot region, and protrusion 1140 that fits within a first aperture, 1109A, beneath the housing exterior wall 1110 or a second aperture, 1109B, beneath housing exterior wall 1115 (to be discussed in more detail below), and projection 1131 for inserting into the housing between ferrules 1120 and 1125. Each of these features is fully reversible such that the push-pull tab is easily removed and repositioned on the opposite exterior wall to change polarity of the connector.

Figures 12B, 12D:
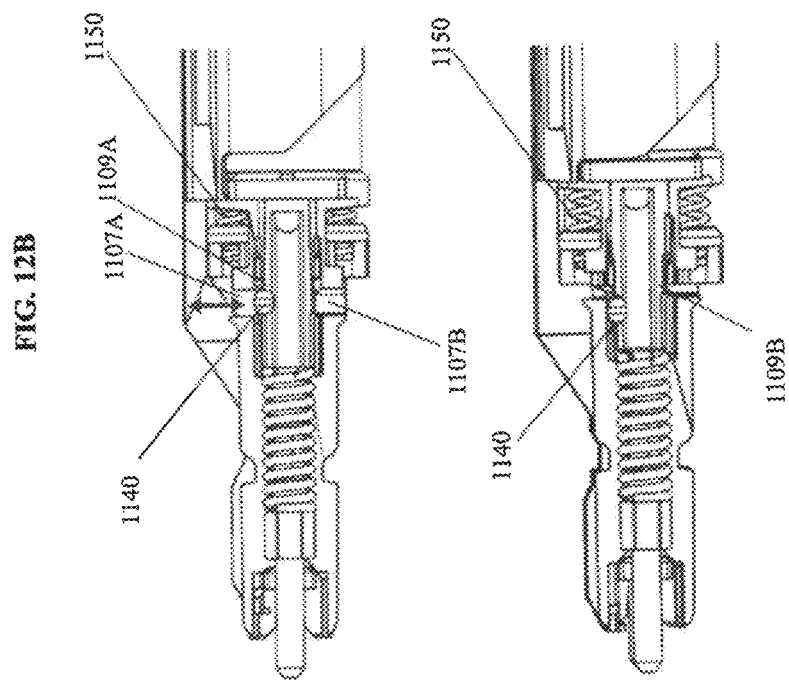
FIGS. 12A-12D depict the operation of the reversible polarity optical connector of FIGS. 11A and 11B.
Figures 12A, 12C:
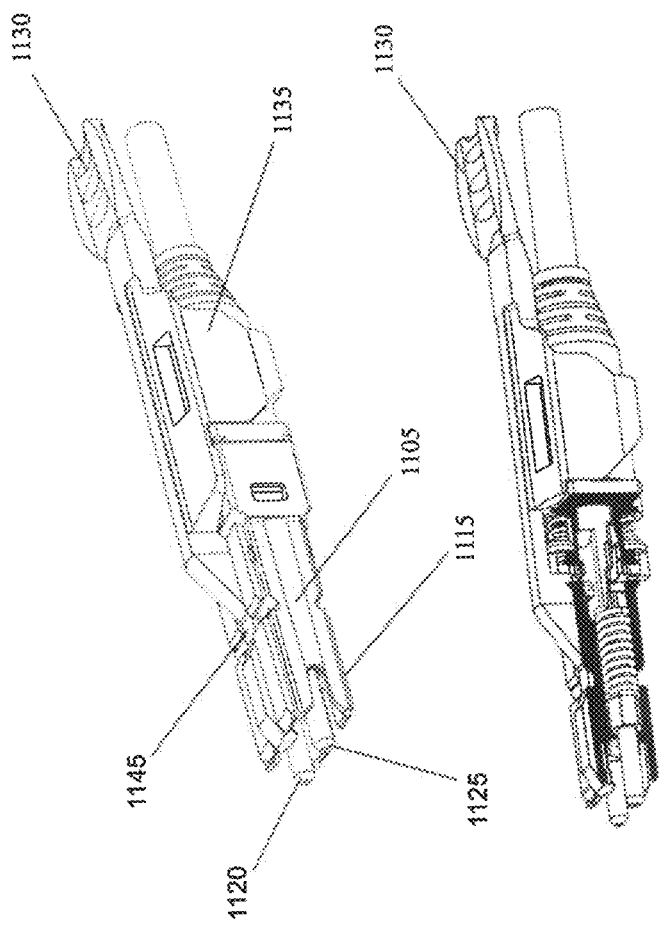
Figure 18B:
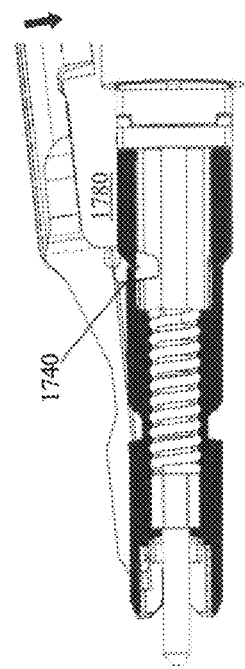
FIGS. 18A-18D depict the assembly of the push-pull tab to the connector body of the connector of FIGS. 17A-17C.
Figure 18C:
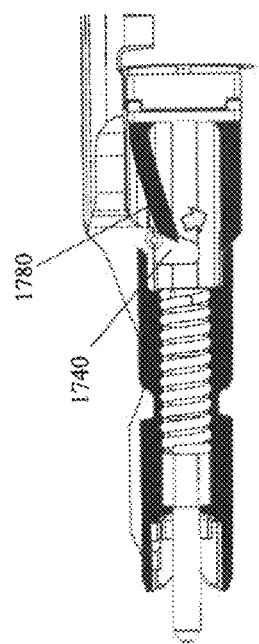
Figure 18A:
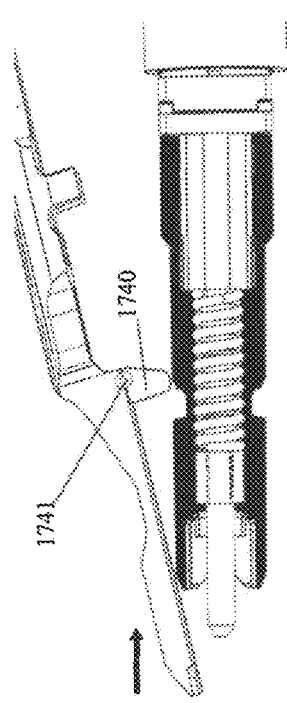
Figure 18D:
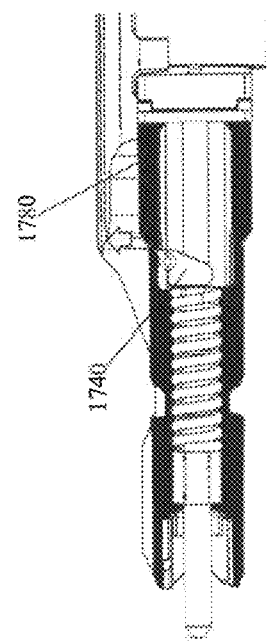

As best seen in FIGS. 12B and 12D, push-pull tab protrusion 1140 may be inserted into first aperture 1109A of housing 1105 through a first exterior housing aperture 1107A. Alternatively, in the reverse-polarity configuration, the push-pull tab protrusion 1140 may be inserted into second housing aperture 1109B through second exterior housing aperture 1107B. When the push-pull tab 1130 is moved forward, the protrusion slides within the aperture 1109A or 1109B, as shown in FIG. 12B. To maintain the push-pull tab in a forward-biased position, tab position spring 1150 is provided. During insertion or removal of the protrusion 1140, tab position spring 1150 is compressed, depicted in FIG. 12B. When the position spring 1150 is in its relaxed (uncompressed) position, FIGS. 12C and 12D, the protrusion 1140 is slid forward within the aperture 1109A or 1109B.

To change polarity of the optical connector 1100, FIGS. 13A-13D, the push-pull tab 1130 is removed by withdrawing the protrusion 1140 from the housing 1105 through exterior housing aperture 1107A along with detaching clips 1135 and decoupling projection 1131, thus releasing the push-pull tab from the first exterior housing wall 1110 (FIG. 13B). The push-pull tab is moved toward second exterior housing wall 1115 and the protrusion 1140 is inserted into aperture 1109B through exterior housing aperture 1107B in FIG. 13C. Projection 1131 is fitted between ferrules 1120 and 1125 and clips 1135 are affixed to the connector. The resultant connector 1100R of 13D is of opposite polarity to the connector 1100 of FIG. 13A.

Various alternatives to the protrusion 1140 of optical connector 1100 may be used in the optical connectors of this disclosure. For example, the protrusion may be provided by the connector housing with receiving elements provided in the push-pull tab. Variations to the shape of the projection and apertures may be made without affecting the function of the reversible-polarity connector.

Another alternative embodiment is depicted in FIGS. 14A and 14B in which a hook-shaped protrusion 1440 is provided for engagement within the connector housing. As in the previous embodiment, the push-pull tab 1430 includes a tab recess 1445, connector-attachment clips 1435 and projection 1431 for positioning between ferrules 1420 and 1425. In FIG. 14B, the push-pull tab 1430 is positioned on first exterior housing wall 1410 and has a first polarity. In this position, the hook-shaped protrusion 1440 engages a housing projection 1460, held in a forward-biased position by push-pull tab position spring 1465, as seen in FIGS. 15B and 15D. To release the protrusion 1440, push-pull tab position spring 1465 is compressed in FIG. 15C such that housing projection 1460 is retracted sufficiently to allow removal of protrusion 1440 through the housing 1405, FIG. 15D.

To change polarity of the optical connector 1400 from the first polarity of FIG. 16A, the push-pull tab 1430 is removed by withdrawing the protrusion 1440 from the housing 1405 through the housing along with detaching clips 1435 and decoupling projection 1431, thus releasing the push-pull tab from the first exterior housing wall 1110 (FIG. 16B). The push-pull tab is moved toward second exterior housing wall 1415 and the protrusion 1440 is inserted into the housing 1405. Projection 1431 is fitted between ferrules 1420 and 1425 and clips 1435 are affixed to the connector in FIG. 16C. The resultant connector 1400R of FIG. 16D is of opposite polarity to the connector of FIG. 16A.

Protrusions from a push-pull tab may be inserted into a housing via features other than a housing aperture. Such a connector is depicted in FIG. 17 and features a deformable housing region to allow entry of a push-pull tab protrusion during affixing of the push-pull tab to the connector housing. As seen in FIG. 17A, the connector 1700 includes a connector housing 1705 which may optionally include a back body housing portion 1709 for connecting with a housing front portion 1707 (FIG. 17C). The back body housing portion 1709 includes a deformable region 1780, seen in the partial cross-section of FIG. 17B and the perspective view of FIG. 17C. The push-pull tab 1730 includes a protrusion 1740 with a projection 1741 extending therefrom.

Turning to FIG. 18, to affix the push-pull tab to the connector housing, the protrusion 1740 penetrates the deformable region 1780 (FIG. 18B) causing the deformable region to yield and accept entry of the protrusion 1740 into the housing. As the projection 1741 enters the housing as depicted in FIG. 18C, the deformable region 1780 returns to its original position (FIG. 18D), securing the push-pull tab 1730 to the connector housing.

Figure 19A:
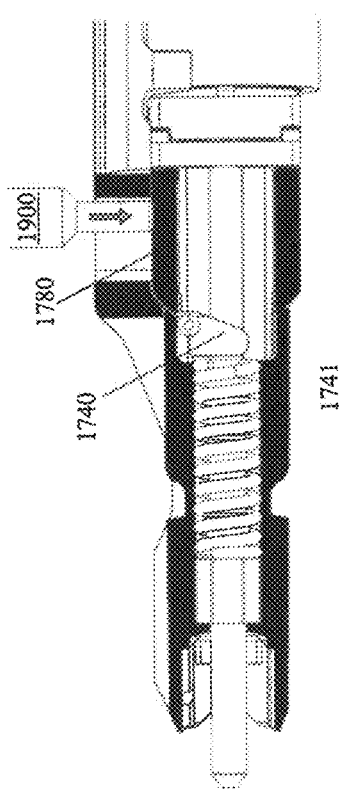
FIGS. 19A-19B depict the removal of the push-pull tab from the connector body using a tool.
Figure 19B:
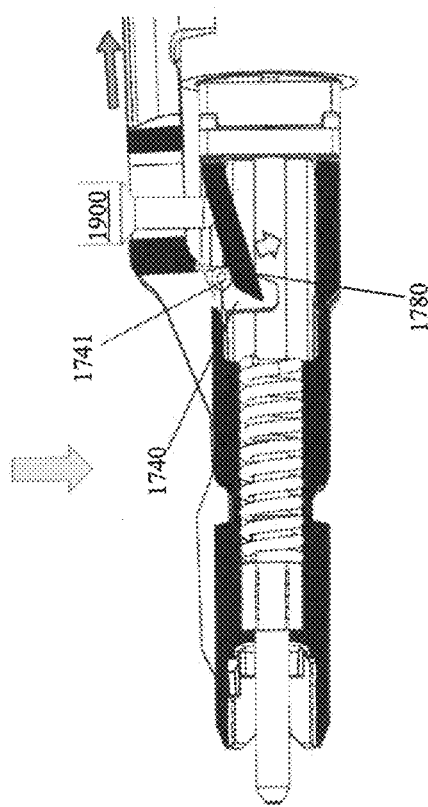

Removal of the push-pull tab 1730 is depicted in FIGS. 19A and 19B. A removal tool 1900, which may be shaped similar to a small screwdriver, depresses deformable region 1780, allowing projection 1741 to slide along an edge of the deformable region 1780, followed by the protrusion 1740, releasing the push-pull tab 1730.

To change polarity of the optical connector 1700 from the first polarity of FIG. 20A, the push-pull tab 1730 is removed in FIG. 20B by using the removal tool technique depicted in FIGS. 19A and 19B. The push-pull tab is moved toward the second exterior housing wall and the protrusion 1740 is inserted into the housing 1705 through the deformable region 1780 in FIG. 20C. The resultant connector 1700R of FIG. 20D is of opposite polarity to the connector of FIG. 20A.

In another aspect of the disclosure, a retaining member may be provided in the connector housing to retain a push-pull tab. As seen in FIGS. 21A-21D, a connector 2100 having a housing 2105 is provided with a housing front portion 2107 and a back portion 2109. FIG. 21A depicts an assembled connector 2100 with housing 2105. FIG. 21B depicts an exploded view of connector 2100 of FIG. 21A. Push-pull tab 2130 has a receiving surface 2132, which during use of connector 2100 provides a surface over which retainer 2111 can slide across during tab movement. Extending from the housing back portion is a retainer 2111 which may include a pair of retaining clips, as shown, or any other structure configured to retain the push-pull tab 2130. FIG. 21C depicts connector 2100 showing a section view cut given by the arrows and broken line near the proximal end of connector 2100. Optionally, when the retainer 2111 includes clips, the clips may be hook-shaped as seen in the cross-sectional view of FIG. 21D. As shown in FIG. 21D, receiving surface 2132 may be a recess with a protrusion along the edge that engages the hook-shaped edge of the clips.

FIG. 22A through FIG. 22E depicts the operation of polarity change for connector 2100 of FIG. 21A-FIG. 21D. FIG. 22A depicts connector 2100 with pull-push tab clips 2135 (opposing side not shown) engaged around connector. To operate connector 2100, user can move push-pull tab 2130 forward or toward front of connector or backward or toward rear of connector, and as describe in FIG. 21 above tab moves along connector receiving surface 2123. This engages or releases connector 2100 from a receptacle as is known in the art. To change the polarity of connector 2100 from the polarity depicted in FIG. 22A to the second, opposite polarity of FIG. 22E, the retainer 2111 is removed from receiving surface 2132. Referring to FIG. 21B, lifting push-pull tab 2130 in direction of up-arrow, separates retainer 2111 from receiving surface. As shown in FIG. 22C, push-pull tab clips separate from the connector as the retainer is removed. Continuing with FIG. 22C, push-pull tab 2130 is moved to the opposite housing exterior wall in FIG. 22C. FIG. 22D depicts receiving surface 2132 engages with the retainer 2111. In FIG. 21E the assembled connector 2100R having the opposite polarity to the connector of FIG. 22A is depicted, fully assembled. Retainer 2111 is in contact with receiving surface 2132, and push-pull tab 2130 is secured to connector body, as show in FIG. 22E.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A reversible polarity fiber optic connector comprising:
   at least first and second optical ferrules;
   a connector housing at least partially surrounding the first and second optical ferrules and having a first exterior wall positioned above the first and second optical ferrules and a second exterior wall positioned beneath the first and second optical ferrules;
   a latch coupling positioned on each of the first and second exterior walls of the housing;
   a removable latch for engaging either of the first and second exterior wall latch couplings on the connector housing;
   wherein positioning the removable latch on the first exterior wall of the connector housing yields a fiber optic connector with a first polarity and positioning the removable latch on the second exterior wall of the housing yields a fiber optic connector with a second polarity, the second polarity being opposite to the first polarity.

2. The reversible polarity fiber optic connector of claim 1, wherein
   each of the latch couplings on the first and second exterior walls of the connector housing includes at least a recess with angled walls; and
   the latch includes at least a protrusion with slanted edges for coupling with the angled walls of the recess on the first exterior wall when the fiber optic connector is configured in the first polarity or the angled walls of the recess on the second exterior wall when the fiber optic connector is configured in the second polarity.

3. The reversible polarity fiber optic connector of claim 1, further comprising a pull tab for engaging the removable latch; wherein pulling the pull tab in a direction away from the first and second ferrules causes the removable latch to be depressed.

4. The reversible polarity fiber optic connector of claim 3, wherein the pull tab comprises at least a first opening and a seconding opening for engaging the removable latch;
   wherein the first opening is configured to allow the connector housing and the removable latch to pass through; and
   the second opening is configured to allow the removable latch to partially pass through.

5. The reversible polarity fiber optic connector of claim 3, wherein the pull tab further comprises a first deformable portion and a second deformable portion;
   wherein the first deformable portion is configured to cooperate with the second deformable portion to depress the removable latch when the pull tab is pulled in a direction away from the first and second ferrules.

6. The reversible polarity fiber optic connector of claim 1, wherein
   each of the latch couplings on the first and second exterior walls of the connector housing includes a groove; and
   at least a projection for coupling with the groove on the first exterior wall when the fiber optic connector is configured in the first polarity or the groove on the second exterior wall when the fiber optic connector is configured in the second polarity.

7. The reversible polarity fiber optic connector of claim 6, further comprising a pull tab for engaging the removable latch; wherein pulling the pull tab in a direction away from the reversible polarity fiber optic connector depresses the removable latch.

8. The reversible polarity fiber optic connector of claim 7, wherein the pull tab comprises:
   an opening for engaging the removable latch; and
   a front protrusion configured to depress the removable latch when the pull tab is pulled in a direction away from the first and second ferrules.

9. A reversible polarity fiber optic connector with exchangeable arms for changing connector type comprising:
   at least first and second optical ferrules;

a common connector housing at least partially surrounding the first and second optical ferrules and having a first exterior wall positioned above the first and second optical ferrules and a second exterior wall positioned beneath the first and second optical ferrules;
a coupling surface positioned on each of the first and second exterior walls of the common connector housing;
a removable arm for engaging either of the first and second exterior wall coupling surfaces on the common connector housing, the removable arm including either a latch or a latch recess;
wherein positioning the removable arm on the first exterior wall of the connector housing yields a fiber optic connector with a first polarity and positioning the removable arm on the second exterior surface of the housing yields a fiber optic connector with a second polarity, the second polarity being opposite to the first polarity.

10. The reversible polarity fiber optic connector of claim 9 wherein positioning a removable arm with a latch on the coupling surface creates a latch-type connector and positioning a removable arm with a recess creates a recess-type connector.

11. The reversible polarity fiber optic connector of claim 9 wherein the housing includes a receiving track in the coupling surface and the removable arm includes a projection for engaging in the receiving track in the coupling surface.

12. The reversible polarity fiber optic connector of claim 9 further comprising a pull tab.

13. The reversible polarity fiber optic connector of claim 12 wherein the removable arm includes a latch and the pull tab is a separate element from the removable arm.

14. The reversible fiber optic connector of claim 12 wherein removable arm includes a recess and the pull tab is integrated with the removable arm.

15. A reversible polarity fiber optic connector comprising:
at least first and second optical ferrules;
a connector housing at least partially surrounding the first and second optical ferrules and having a first exterior wall positioned above the first and second optical ferrules and a second exterior wall positioned beneath the first and second optical ferrules;
a first aperture in the first exterior wall of the housing and a second aperture in the second exterior wall of the housing;
a removable push-pull tab including a protrusion for positioning through either of the first or second apertures in the first and second exterior walls, respectively, of the connector housing;
wherein positioning the removable push-pull tab with its protrusion in the first aperture of the first exterior wall of the connector housing yields a fiber optic connector with a first polarity and positioning the removable push-pull tab with its protrusion in the second aperture of the second exterior wall of the housing yields a fiber optic connector with a second polarity, the second polarity being opposite to the first polarity.

16. The reversible polarity fiber optic connector of claim 15 further comprising first and second apertures respectively beneath the first and second exterior walls of the housing for receiving the protrusion.

17. The reversible polarity fiber optic connector of claim 15, further comprising a spring to urge the push-pull tab forward.

18. The reversible polarity fiber optic connector of claim 15, wherein the push-pull tab protrusion is retained by a housing latch, the housing latch being urged forward by a spring.

19. A reversible polarity fiber optic connector comprising:
at least first and second optical ferrules;
a connector housing at least partially surrounding the first and second optical ferrules and having a first exterior wall positioned above the first and second optical ferrules and a second exterior wall positioned beneath the first and second optical ferrules;
a first deformable region in the first exterior wall of the housing and a second deformable region in the second exterior wall of the housing;
a removable push-pull tab including a protrusion for positioning within though either of the first or second deformable regions in the first and second exterior walls, respectively, of the connector housing;
wherein positioning the removable push-pull tab with its protrusion through the first deformable region of the first exterior wall of the connector housing yields a fiber optic connector with a first polarity and positioning the removable push-pull tab with its protrusion through the second deformable region of the second exterior wall of the housing yields a fiber optic connector with a second polarity, the second polarity being opposite to the first polarity.

20. The combination of the reversible polarity fiber optic connector of claim 19 and a tool for deforming the deformable region of either the first exterior wall of the housing or the second exterior wall of the housing.

21. The reversible polarity fiber optic connector of claim 19, further comprising a spring to urge the push-pull tab forward.

22. The reversible polarity fiber optic connector of claim 19 further comprising first and second apertures respectively beneath the first and second exterior walls of the housing for receiving the protrusion from the deformable region.

23. A reversible polarity fiber optic connector comprising:
at least first and second optical ferrules;
a connector housing at least partially surrounding the first and second optical ferrules and having a first exterior wall positioned above the first and second optical ferrules and a second exterior wall positioned beneath the first and second optical ferrules;
a removable push-pull tab;
a first push-pull tab retainer positioned on the first exterior wall and a second push-pull tab retainer positioned on the second exterior wall;
wherein positioning the removable push-pull tab in the retainer on the first exterior wall of the connector housing yields a fiber optic connector with a first polarity and positioning the removable push-pull tab in the retainer on the second exterior wall of the housing yields a fiber optic connector with a second polarity, the second polarity being opposite to the first polarity.

24. The reversible polarity fiber optic connector of claim 23 wherein the first and second push-pull tab retainers each include a projection.

25. The reversible polarity fiber optic connector of claim 23 wherein each projection is a clip for receiving a portion of the push-pull tab.

* * * * *

(12) EX PARTE REEXAMINATION CERTIFICATE (11755th)
United States Patent
Wong et al.

(10) Number: US 10,191,230 C1
(45) Certificate Issued: Nov. 16, 2020

(54) OPTICAL CONNECTORS WITH REVERSIBLE POLARITY

(71) Applicant: SENKO Advanced Components, Inc., Marlborough, MA (US)

(72) Inventors: Kimman Wong, Hong Kong (HK); Jeffrey Gniadek, Northbridge, MA (US); Kazuyoshi Takano, Southborough, MA (US); Siu Kei Ma, Hong Kong (HK)

(73) Assignee: SENKO ADVANCED COMPONENTS, INC, Marlborough, MA (US)

Reexamination Request:
No. 90/014,456, Feb. 19, 2020

Reexamination Certificate for:
Patent No.: 10,191,230
Issued: Jan. 29, 2019
Appl. No.: 15/884,327
Filed: Jan. 30, 2018

Related U.S. Application Data

(60) Provisional application No. 62/581,961, filed on Nov. 6, 2017, provisional application No. 62/546,920, filed on Aug. 17, 2017, provisional application No. 62/485,042, filed on Apr. 13, 2017, provisional application No. 62/463,901, filed on Feb. 27, 2017, provisional application No. 62/463,898, filed on Feb. 27, 2017, provisional application No. 62/457,150, filed on Feb. 9, 2017, provisional application No. 62/452,147, filed on Jan. 30, 2017.

(51) Int. Cl.
*G02B 6/38* (2006.01)
*G02B 6/40* (2006.01)

(52) U.S. Cl.
CPC ......... *G02B 6/3893* (2013.01); *G02B 6/3821* (2013.01); *G02B 6/3879* (2013.01); *G02B 6/406* (2013.01)

(58) Field of Classification Search
None
See application file for complete search history.

(56) References Cited

To view the complete listing of prior art documents cited during the proceeding for Reexamination Control Number 90/014,456, please refer to the USPTO's public Patent Application Information Retrieval (PAIR) system under the Display References tab.

*Primary Examiner* — William C Doerrler

(57) ABSTRACT

Reversible polarity fiber optic connectors are provided having housings at least partially surrounding first and second optical ferrules with walls above and beneath the ferrules. Positioning removable elements such as latches, removable arms, or push-pull tabs on the first wall above the ferrules yields fiber optic connectors with a first polarity type, and positioning the removable elements on the second wall beneath the ferrules yields fiber optic connectors with a second, opposite polarity type. Various engagement mechanisms are provided on either the connector housing walls or on the removable elements, or both, to assist in affixing the removable element to the connector housing.

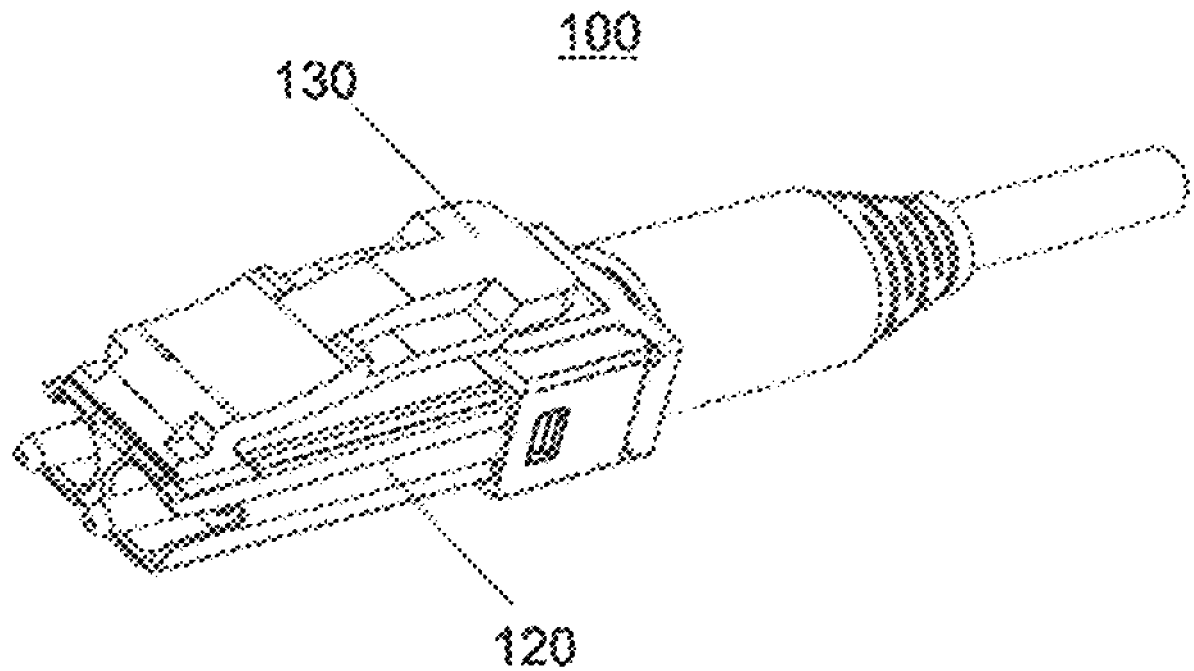

US 10,191,230 C1

EX PARTE
REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 9, 15, 19 and 23 are determined to be patentable as amended.

Claims 2-8, 10-14, 16-18, 20-22, 24 and 25, dependent on an amended claim, are determined to be patentable.

New claims 26-34 are added and determined to be patentable.

1. A reversible polarity fiber optic connector comprising:
at least first and second optical ferrules;
a connector housing *having a longitudinal axis and comprising an exterior portion* at least partially surrounding the first and second optical ferrules [and having] *such that the exterior portion extends 360° circumferentially with respect to the longitudinal axis about a space in which each of the first and second optical ferrules are received, the exterior portion comprising* a first exterior wall positioned above the first and second optical ferrules and a second exterior wall positioned beneath the first and second optical ferrules;
a latch coupling positioned on each of the first and second exterior walls of the connector housing;
a removable latch for engaging either of the first and second exterior wall latch couplings on the connector housing;
wherein positioning the removable latch on the first exterior wall of the connector housing yields a fiber optic connector with a first polarity and positioning the removable latch on the second exterior wall of the connector housing yields a fiber optic connector with a second polarity, the second polarity being opposite to the first polarity.

9. A reversible polarity fiber optic connector with exchangeable arms for changing connector type comprising:
at least first and second optical ferrules;
a common connector housing *having a longitudinal axis and comprising an exterior portion* at least partially surrounding the first and second optical ferrules [and having] *such that the exterior portion extends 360° circumferentially with respect to the longitudinal axis about a space in which each of the first and second optical ferrules are received, the exterior portion comprising* a first exterior wall positioned above the first and second optical ferrules and a second exterior wall positioned beneath the first and second optical ferrules;
a coupling surface positioned on each of the first and second exterior walls of the common connector housing;
a removable arm for engaging either of the first and second exterior wall coupling surfaces on the common connector housing, the removable arm including either a latch or a latch recess;
wherein positioning the removable arm on the first exterior wall of the *common* connector housing yields a fiber optic connector with a first polarity and positioning the removable arm on the second exterior surface of the *common connector* housing yields a fiber optic connector with a second polarity, the second polarity being opposite to the first polarity.

15. A reversible polarity fiber optic connector comprising:
at least first and second optical ferrules;
a connector housing *having a longitudinal axis and comprising an exterior portion* at least partially surrounding the first and second optical ferrules [and having] *such that the exterior portion extends 360° circumferentially with respect to the longitudinal axis about a space in which each of the first and second optical ferrules are received, the exterior portion comprising* a first exterior wall positioned above the first and second optical ferrules and a second exterior wall positioned beneath the first and second optical ferrules;
a first aperture in the first exterior wall of the connector housing and a second aperture in the second exterior wall of the connector housing;
a removable push-pull tab including a protrusion for positioning through either of the first or second apertures in the first and second exterior walls, respectively, of the connector housing;
wherein positioning the removable push-pull tab with its protrusion in the first aperture of the first exterior wall of the connector housing yields a fiber optic connector with a first polarity and positioning the removable push-pull tab with its protrusion in the second aperture of the second exterior wall of the connector housing yields a fiber optic connector with a second polarity, the second polarity being opposite to the first polarity.

19. A reversible polarity fiber optic connector comprising:
at least first and second optical ferrules;
a connector housing *having a longitudinal axis and comprising an exterior portion* at least partially surrounding the first and second optical ferrules [and having] *such that the exterior portion extends 360° circumferentially with respect to the longitudinal axis about a space in which each of the first and second optical ferrules are received, the exterior portion comprising* a first exterior wall positioned above the first and second optical ferrules and a second exterior wall positioned beneath the first and second optical ferrules;
a first deformable region in the first exterior wall of the connector housing and a second deformable region in the second exterior wall of the connector housing;
a removable push-pull tab including a protrusion for positioning within though either of the first or second deformable regions in the first and second exterior walls, respectively, of the connector housing;
wherein positioning the removable push-pull tab with its protrusion through the first deformable region of the first exterior wall of the connector housing yields a fiber optic connector with a first polarity and positioning the removable push-pull tab with its protrusion through the second deformable region of the second exterior wall of the *connector* housing yields a fiber optic connector with a second polarity, the second polarity being opposite to the first polarity.

23. A reversible polarity fiber optic connector comprising:
at least first and second optical ferrules;
a connector housing *having a longitudinal axis and comprising an exterior portion* at least partially surrounding the first and second optical ferrules [and having] *such that the exterior portion extends 360° circumferentially with respect to the longitudinal axis about a* space in which each of the first and second optical ferrules are received, the exterior portion comprising a first exterior wall positioned above the first and second optical ferrules and a second exterior wall positioned beneath the first and second optical ferrules;

a removable push-pull tab;

a first push-pull tab retainer positioned on the first exterior wall and a second push-pull tab retainer positioned on the second exterior wall;

wherein positioning the removable push-pull tab in the retainer on the first exterior wall of the connector housing yields a fiber optic connector with a first polarity and positioning the removable push-pull tab in the retainer on the second exterior wall of the connector housing yields a fiber optic connector with a second polarity, the second polarity being opposite to the first polarity.

26. The reversible polarity fiber optic connector of claim 1, wherein latch coupling includes a receiving track, wherein the removable latch comprises a projection for engaging each receiving track, and wherein the projection has a dovetail shape.

27. The reversible polarity fiber optic connector of claim 1, wherein the removable latch comprises a base portion and a depressible latch having a front end portion connected to the base portion, a free rear end portion spaced apart from the front end portion along the axis and being raised relative to the front end portion, and an outward facing longitudinal surface extending along the axis from the front end portion to the free rear end portion, the removable latch being bendable such that the free rear end portion can be depressed toward the base portion.

28. The reversible polarity fiber optic connector of claim 27, further comprising a remote release including an elongate front section configured to extend longitudinally along the connector housing and engage the depressible latch arm and an elongate rear section extending rearward from the elongate front section, the elongate front section of the remote release being slidably connected to the removable latch such that the elongate front section can move rearward relative to removable latch.

29. The reversible polarity fiber optic connector of claim 28, wherein the elongate front section comprises an opening configured to receive the depressible latch arm and a front end portion defining a front end of the opening, the front end portion of the front elongate section being configured to slide rearward along the outward facing surface of the depressible latch arm when the elongate front section moves rearward to depress the depressible latch arm.

30. The reversible polarity fiber optic connector of claim 27, wherein each latch coupling includes a groove having an open axial end and the removable latch comprises a protrusion on the base portion configured to be inserted into the groove through the open axial end.

31. The reversible polarity fiber optic connector as set forth in claim 1, further comprising first and second ferrule springs received on the first and second ferrules, respectively, wherein the connector housing comprises a single front body and a single back body configured to attach to the single front body such that the first and second ferrule springs are compressed simultaneously between the single back body and the single front body.

32. The reversible polarity fiber optic connector as set forth in claim 1, wherein the first and second optical ferrules have a pitch of about 4.8 mm or less.

33. The reversible polarity fiber optic connector as set forth in claim 1, wherein the connector housing is a single combined housing for each of the first and second optical ferrules.

34. The reversible polarity fiber optic connector as set forth in claim 1, wherein the exterior portion of the housing radially overlaps a longitudinal segment of each of the first and second optical ferrules with respect to the axis.

* * * * *